United States Patent [19]

Ukigawa et al.

[11] Patent Number: 6,101,461
[45] Date of Patent: Aug. 8, 2000

[54] COMMAND INPUTTING METHOD

[75] Inventors: Kazunori Ukigawa; Hatsuko Ukigawa; Hiroki Amou, all of Tokushima; Akinori Sakai, Tokyo; Seiko Wakatsuki, Tokushima, all of Japan

[73] Assignee: Justsystem Corp., Tokushima, Japan

[21] Appl. No.: 08/889,511

[22] Filed: Jul. 8, 1997

[30] Foreign Application Priority Data

Feb. 28, 1997 [JP] Japan ..................................... 9-046603

[51] Int. Cl.⁷ ............................. G06F 17/21; G06F 15/00
[52] U.S. Cl. .............................................. 704/10; 707/535
[58] Field of Search .................................. 704/1, 9, 3, 10; 707/532, 534, 535; 341/28; 382/185

[56] References Cited

U.S. PATENT DOCUMENTS

| | | | |
|---|---|---|---|
| 4,543,631 | 9/1985 | Kurosu et al. | 707/535 |
| 4,744,050 | 5/1988 | Hirosawa et al. | 704/1 |
| 5,084,820 | 1/1992 | Nagaya et al. | 704/1 |
| 5,617,314 | 4/1997 | Zhong | 704/2 |
| 5,680,520 | 10/1997 | Watanabe et al. | 395/110 |
| 5,713,033 | 1/1998 | Sado | 704/1 |

FOREIGN PATENT DOCUMENTS

| | | | |
|---|---|---|---|
| 4-153873 | 5/1992 | Japan | G06F 15/20 |
| 4-260970 | 9/1992 | Japan | G06F 15/20 |

*Primary Examiner*—Forester W. Isen
*Assistant Examiner*—Patrick N. Edouard
*Attorney, Agent, or Firm*—McDermott, Will & Emery

[57] ABSTRACT

The present invention comprises a Chinese character information outputting step for outputting Chinese character information corresponding to an input arbitrary character string by referring to a Chinese dictionary in which Chinese character information comprising a command and/or at least one Chinese character correlated to a character string. Chinese character information is received from the Chinese character information outputting step and the correlated Chinese character is displayed as a candidate for conversion in a list. The present invention includes a selecting step of selecting a desired Chinese character or a command from the Chinese character information displayed in the list and a determining step for determining which of a Chinese character and a command has been selected. The command is executed when a command has been selected and the input character string is replaced with Chinese characters displayed when it is determined in the determining step that a Chinese character has been selected.

25 Claims, 21 Drawing Sheets

| CHARACTER STRING | CANDIDTE FOR CONVERSION | FLAG |
|---|---|---|
| いんさつ | 印刷 | 0 |
|  | 印刷コマンド | 1 |
| : | : | : |
| おわり | 終わり | 0 |
|  | 尾張 | 0 |
|  | 終了コマンド | 1 |
| : | : | : |
| しゅうりょう | 終了 | 0 |
|  | 修了 | 0 |
|  | 収量 | 0 |
|  | 秋涼 | 0 |
|  | 終了コマンド | 1 |
| : | : | : |
| ぷりんと | プリント | 0 |
|  | 印刷コマンド | 1 |
| : | : | : |
| もじ | 文字 | 0 |
|  | 門司 | 0 |
| : | : | : |

FIG.5

FEPは、主としてOS（オペレーティング・システム）とアプリケーション・ソフトとの間で働くかな漢字変換のためのソフトウェアである。

しゅうりょう|
⎵
CHARACTER STRING

FIG.8

FEPは、主としてOS（オペレーティング・システム）とアプリケーション・ソフトとの間で働くかな漢字変換のためのソフトウェアである。⏎

| CHARACTER STRING | CANDIDATE FOR CONVERSION | FLAG |
|---|---|---|
| いんさつ | 印刷 | 00 |
| | 印刷コマンド | 01 |
| : | : | : |
| おわり | 終わり | 00 |
| | 尾張 | 00 |
| | 終了コマンド | 01 |
| : | : | : |
| こうせい | 構成 | 00 |
| | 校正 | 00 |
| | 厚生 | 00 |
| | 文書校正コマンド | 01 |
| : | : | : |
| しゅうりょう | 終了 | 00 |
| | 修了 | 00 |
| | 収量 | 00 |
| | 秋涼 | 00 |
| | 終了コマンド | 01 |
| : | : | : |
| はんばい | 販売 | 00 |
| | 販売実績表マクロ | 11 |
| : | : | : |
| ぷりんと | プリント | 00 |
| | 印刷コマンド | 01 |
| : | : | : |
| もじ | 文字 | 00 |
| | 門司 | 00 |
| : | : | : |

1200

[SALES PERFORMANCE TABLE]

|  | JANUARY | FEBRUARY | MARCH | APRIL | MAY | ... |
|---|---|---|---|---|---|---|
| STORE A |  |  |  |  |  | ... |
| STORE B |  |  |  |  |  | ... |
| STORE C |  |  |  |  |  | ... |
| TOTAL |  |  |  |  |  | ... |

| CHARACTER STRING | COMMAND/MACRO COMMAND |
|---|---|
| end | 終了コマンド |
| exit | 終了コマンド |
| sellmacro | 販売実績表マクロ |
| print | 印刷コマンド |

This invention relates to a front-end processor (FEP)
which controls the input of commands.
end
⌣
CHARACTER STRING

FIG.25

This invention relates to a front-end processor (FEP)
which controls the input of commands.
end 123456
⌣    ⌣
CHARACTER  PASSWORD
STRING

COMMAND INPUTTING METHOD

FIELD OF THE INVENTION

The present invention relates to a command inputting method, and more particularly to a command inputting method with Kana (Japanese character)-to-Chinese character conversion.

BACKGROUND OF THE INVENTION

With application software, a desired processing can be executed by inputting a command through either a keyboard or a mouse. It is assumed in the following description, for instance, that one of the lines in a text prepared by a word processor is to be deleted with a key operation. Generally, the line is deleted by executing the operations of displaying a menu, selecting a command "delete", further selecting a command "a unit of line", and specifying the line to be deleted. On the other hand, a system in which a command is selected from the menu requires a number of key strokes. Thus, shortcut keys are prepared in the application for inputting commands with a fewer number of key strokes than that in the ordinary mode. By using these shortcut keys, a line can be deleted with one operation, for instance, of pressing down a delete key while a shift key is pressed down.

Also when a command is to be input using a mouse, there are prepared two types of inputting systems: a menu system in which a desired processing is executed by successively selecting each command from the menu, and a shortcut inputting system in which a command can be executed with one operation, like the shortcut keys, by clicking a button or the like displayed on a screen.

However, when a command is to be input with the shortcut keys, it is required to remember a different set of key operations for each application software because keys allocated to commands are different in each application.

Also when a command is to be input by clicking a button or the like displayed on a screen with a mouse, the display format of buttons or the like is different in each application software. Thus, an operator has to remember various mappings between buttons and commands for each application software. Also, when inputting characters using a keyboard, the operator has to move his (her) hand off the keyboard to operate a mouse, which prevents high-speed operations for inputting characters.

SUMMARY OF THE INVENTION

It is an object of the present invention to improve the operability of application software by making it possible to input a command in the same way as that for inputting characters.

With the present invention, a command can be input in the same way as that of inputting characters.

With the present invention, there is provided a command inputting method for inputting characters using software for Kana (Japanese character)-to-Chinese character conversion which enables command input in the same way as that of inputting characters. The command inputting method also provides a command input environment common to different types of applications by using the software for Kana-to-Chinese character conversion.

With the present invention, there is provided a command inputting method for inputting characters using software for Kana (Japanese character)-to-Chinese character conversion which enables command input in the same way as that of inputting characters. The command inputting method also provides a command input environment common to different types of applications by using the software for Kana-to-Chinese character conversion. Also the command inputting method using the software for Kana-to-Chinese character conversion prevents an erroneous selection by setting a Chinese character as a first candidate when displaying candidates for conversion.

With the present invention, there is provided a command inputting method used when inputting characters using the software for Kana-to-Chinese character conversion which makes it possible to find out a desired command according to a synonym, for instance, by previously storing the same commands in correlation to character strings each having the same meaning in a Chinese character dictionary. For instance, when it is required to end execution of an application software, a desired command can be found out by inputting a word relating to termination and subjecting the word to Kana-to-Chinese conversion.

With the present invention, there is provided a command inputting method used when inputting characters using the software for Kana-to-Chinese character conversion which makes it possible to add a command in the same way as that for inputting characters.

With the present invention, there is provided a command inputting method used when inputting characters using the software for Kana-to-Chinese character conversion which makes it possible to register a macro command prepared by a user and execute the macro command by specifying it in the same way as that for inputting characters.

With the present invention, there is provided a command inputting method used when inputting characters using the software for Kana-to-Chinese character conversion which makes it possible to change a command or a macro command to a desired command or a desired macro command and also to delete an unnecessary command or an unnecessary macro command.

With the present invention, there is provided a command inputting method used when inputting characters using the software for Kana-to-Chinese character conversion which provides users with a means for determining at once whether a display candidate for conversion is a Chinese character or a command.

With the present invention, there is provided a command inputting method used when inputting characters using the software for Kana-to-Chinese character conversion which provides users with a means for determining at once whether a displayed candidate for conversion is a Chinese character, or a command, or a macro command.

With the present invention, there is provided a command inputting method used when inputting characters using the software for Kana-to-Chinese character conversion which makes it possible to specify a macro command and execute the macro command in the same way as that for inputting characters and also which provides environment for execution of a macro commands common to different types of application software by using the software for Kana-to-Chinese character conversion to specify the macro command.

With the present invention, there is provided a command inputting method used when inputting characters using the software for Kana-to-Chinese character conversion which can prevent a command or a macro command from being displayed as a candidate for conversion, even if the command or the macro command is included among the candidates for conversion, in a sentence, or displayed as a candidate for conversion by inhibiting its selection.

With the present invention, there is provided a command inputting method which makes it possible to input a command in the same way as that for inputting characters and provides an environment for inputting commands common to different types of application software.

With the present invention, there is provided a computer-readable medium which makes it possible to input a command in the same way as that for inputting characters by causing a computer to execute a recorded program which provides an environment for inputting a command common to different types of application software.

Other objects and features of this invention will become understood from the following description with reference to the accompanying drawings.

BRIEF DESCRIPTION OF THE DRAWINGS

FIG. 5 is an explanatory view showing a screen display in a case where a Japanese character string of age "しゅうりょう" (pronounced as shuryo and meaning "End" among a plurality of meanings) has been input by the command inputting method according to Embodiment 1;

FIG. 8 is an explanatory view showing a state in which the Japanese character string of "しゅうりょう(shuryo)" has been replaced with the corresponding Chinese characters "終了" (also pronounced as "shuryo") and the Chinese characters is displayed on the screen by the command inputting method according to Embodiment 1;

FIG. 12 is an explanatory view of a Chinese character information table used for executing a command inputting method according to Embodiment 2;

FIG. 24 is an explanatory view showing a screen display in which an English character string of "end" has been inputted by the command in putting method according to Embodiment 3; and FIG. 25 is an explanatory view showing a screen display in which a character string of "123456" has been inputted by the command inputting method according to Embodiment 3.

DESCRIPTION OF THE PREFERRED EMBODIMENTS

Figure 1:
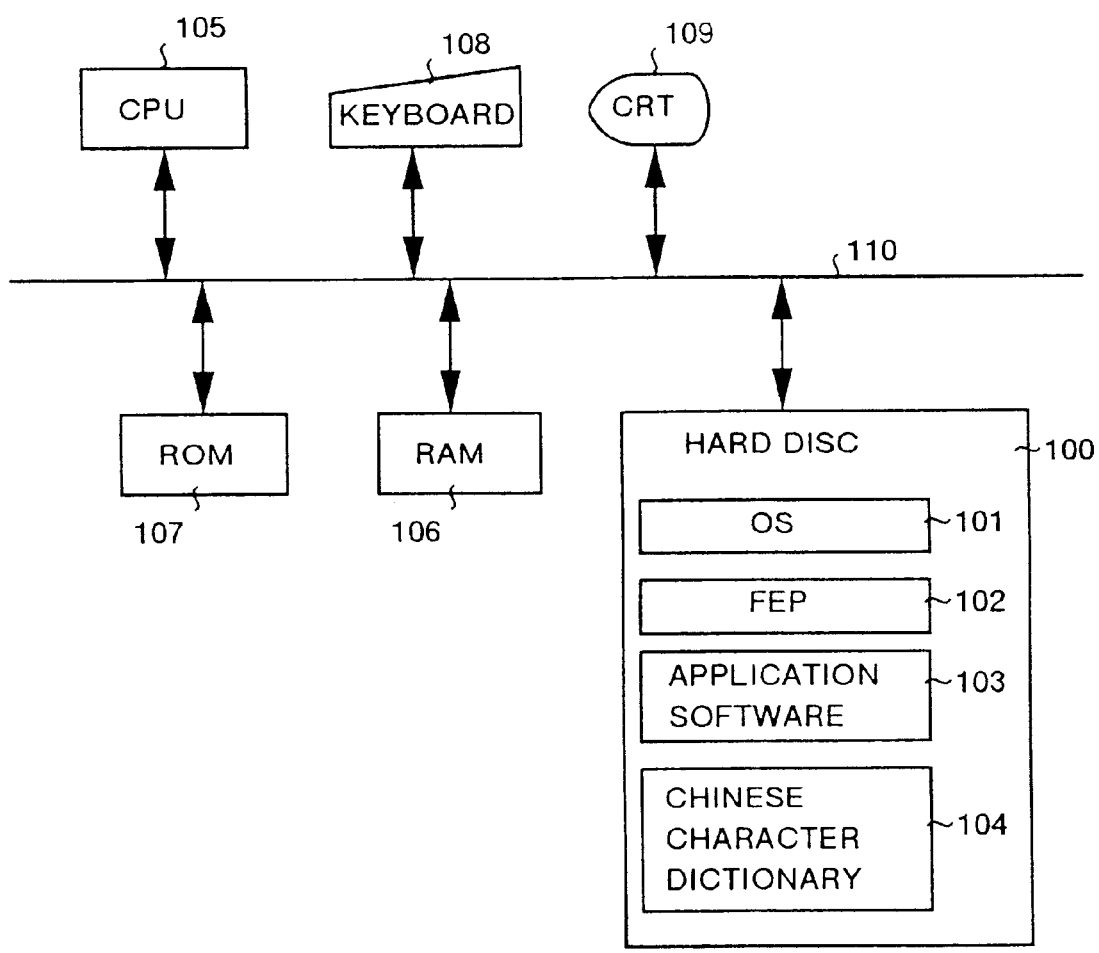
FIG. 1 is a block diagram showing one example of a device for executing the command inputting method according to the present invention.

Detailed description is made hereinafter for embodiments of the command inputting method, the command inputting method used when inputting characters using software for Kana-to-Chinese character conversion, and the computer-readable medium in which a program making a computer execute the method is recorded (described "a command inputting method" hereinafter) with reference to the related drawings. It should be noted that description is at first made hereinafter for an outline of the command inputting method according to the present invention to explain its characteristics, and then for embodiments of the command inputting method according to the present invention.

The command inputting method according to the present invention is designed so that commands can be input, not using shortcut keys or the like, but through a keyboard in the same way as characters are input, for instance, when preparing a text.

For instance, when a text in the Japanese language is prepared, for instance, with a word processor, the text is prepared by repeating operations of inputting a Kana (Japanese character) string and converting the input character string to Chinese characters using software for Kana-to-Chinese character conversion (described "FEP (Front-End Processor)" hereinafter). In the command inputting method according to the present invention, commands can be inputted using this FEP. Namely, Chinese characters and commands correlated to a certain character string are previously stored in a Chinese character dictionary. The Chinese character as well as the command name can be displayed on a screen as candidates for conversion when an arbitrary character string is subjected to the Kana-to-Chinese character conversion. Then, when a command name is selected from the candidates for conversion displayed on the screen, the corresponding command is automatically executed. For instance, a command of "終了コマンド" (pronounced as "shuryo komando" and having the meaning of "end command") together with Chinese characters such as "終了" (also pronounced as "shuryo" and meaning "end"), "修了" (also pronounced as "shuryo" and meaning "completion of studying") or the like is correlated to a Japanese character string of "しゅうりょう" (pronounced as "shuryo" and meaning "end" among a plurality of meanings) and is previously stored in the Chinese character dictionary. Then, when the Japanese character string of "しゅうりょう (shuryo)" is input with a word processor and the Kana-to-Chinese character conversion is instructed to the FEP, "終了コ マンド" is displayed together with the Chinese characters such as "終了" "修了" or the like on the screen as candidates for conversion. Then, when the "終了コマンド" is selected from the candidates for conversion, the processing for terminating operations of the word processor is automatically executed.

Also, when a text in English is to be prepared with a word processor, different from the case in which Japanese words are input, the text can be processed simply by inputting just the character strings. The FEP is not required where a text is prepared in English. Thus, command determination software is used in place of the FEP in the command inputting method according to the present invention. Namely, a table in which a character string is correlated to a command is provided in the command determination software. Thus, when the character string is input, the corresponding command can automatically be executed. For instance, an English character string of "end" and a command "終了コマンド" (pronounced as "shuryo komando" and meaning "end command") correlated to the English character string of "end" are previously stored in the table of the command determination software with a desired character string such as a password or the like stored therein. Then, when the character string of "end" and the password are input with a word processor, the command determination software determines that the inputted character string is an end command, and the processing for exiting the word processor is automatically executed.

The processing for inputting a command as described above can be executed with a device such as the personal computer shown in FIG. 1 as well as with software incorporated in the device. FIG. 1 is a block diagram showing one example of a device for executing the command inputting method according to the present invention. In FIG. 1, the reference numeral 100 indicates a hard disk for storing therein an OS (Operating System) 101, an FEP 102 which is software for Kana-to-Chinese character conversion, various types of application software 103, and a Chinese character dictionary 104 in which Chinese characters and commands each correlated to a character string are stored. The reference numeral 105 indicates a CPU for reading the OS 101, FEP 102 and application software 103 from the hard disk 100 onto a RAM 106 and executing the processing for inputting commands. Also in the figure, designated as the reference numeral 107 is a ROM with a control program for the CPU 105 stored therein; as 108 a keyboard for inputting characters, inputting an instruction for Kana-to-Chinese character conversion, and inputting an instruction for selection/decision of a candidate for conversion or the like; as 109 a CRT (cathode ray tube) for displaying an inputted character string and candidates for conversion or the like as 110 a bus connected to each of the sections described above for data transactions among them. However, when a text is to be prepared in English, the Chinese character dictionary 104 is not necessary, and the command determination software is used in place of the FEP 102. Also, the Chinese character dictionary 104 is stored in the hard disk 100 and is used as it is.

Herein, description is made for embodiments of the command inputting method according to the present invention. Herein description is made for a command inputting method in a case of inputting Japanese in Embodiment 1; description is made for methods of registering a command and a macro command, inputting the registered command or specifying the macro command in Embodiment 2; and description is further made for a command inputting method in a case of inputting English in Embodiment 3.

Figure 2:
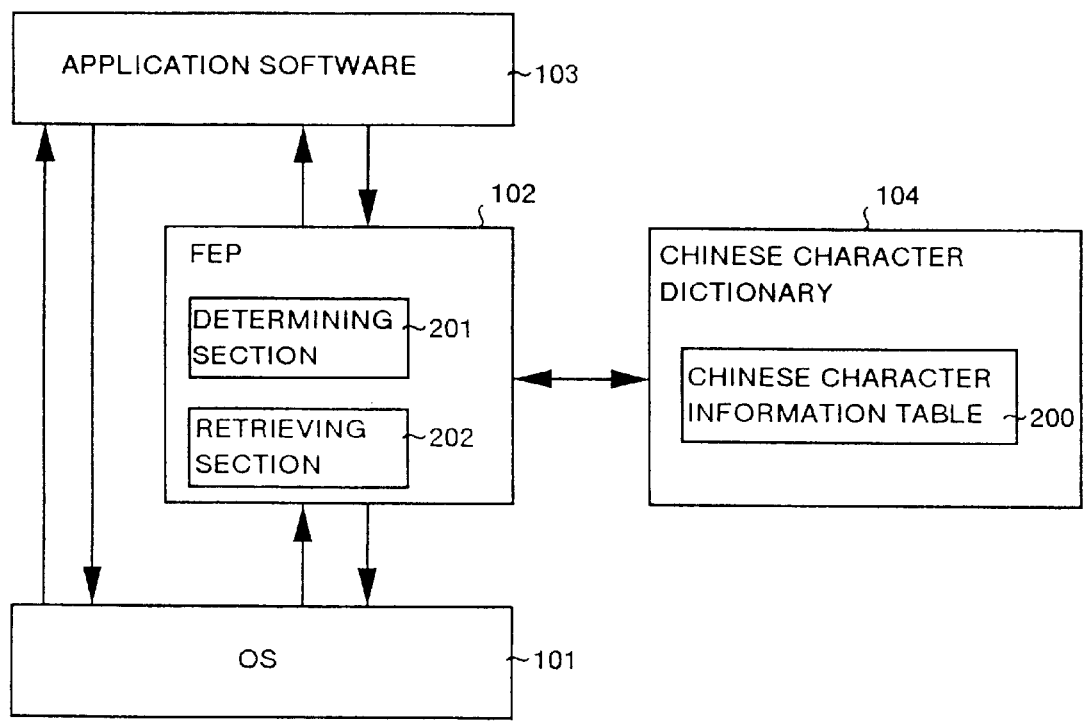
FIG. 2 is a functional block diagram showing software configuration for implementing a command inputting method according to Embodiment 1.

FIG. 2 is a functional block diagram showing a software configuration for executing a command inputting method according to Embodiment 1 of the present invention. In FIG. 2, the OS 101 provides an environment for effective use of the device shown in FIG. 1 for users, and executes processing for management of the application software 103 as well as of the FEP 102, management of input/output of data, management of allocation of memory to each data, and processing for a screen display or the like.

The application software 103 may be a word processor, spreadsheet software, or database software or the like so long as characters can be input. This application software 103 is controlled by the OS 101 in its initialization, execution of various commands, and end processing or the like.

Figure 3:
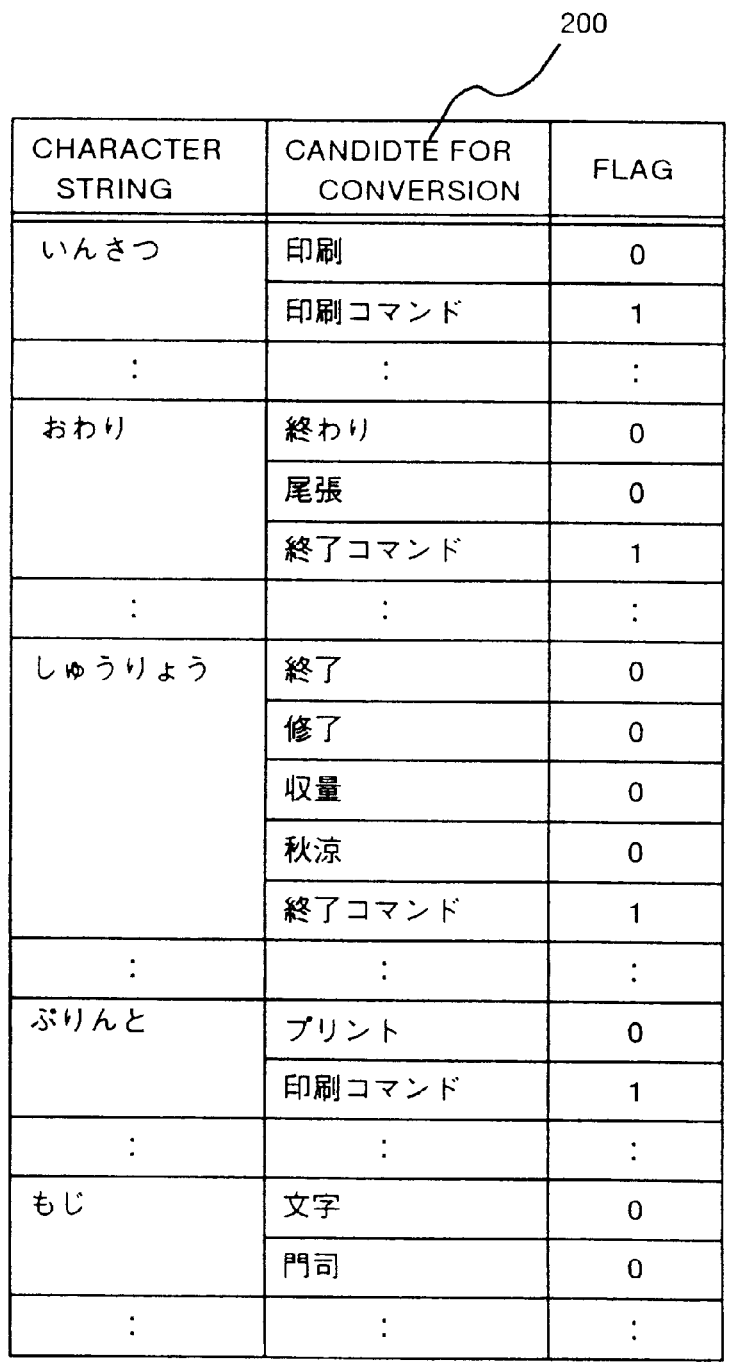
FIG. 3 is an explanatory view of a Chinese character information table used for implementing the command inputting method according to Embodiment 1.

The Chinese character dictionary 104 has a Chinese character information table 200 used for Kana-to-Chinese character conversion. FIG. 3 is an explanatory view for explaining of the Chinese character information table 200 used for executing the command inputting method according to the present invention. The Chinese character information table 200 stores therein first Chinese character information comprising at least one Chinese character correlated to a character string and second Chinese character information comprising a command and at least one Chinese character each correlated to a character string. It should be noted that FIG. 3 does not show all of the first Chinese character information and the second Chinese character information for convenience of illustration.

The Chinese character information table 200 stores therein, as the first Chinese character information, for instance, Chinese characters correlated to a Japanese character string "もじ" (pronounced as "moji" and meaning "character" among a plurality of meanings) such as "文字" (pronounced as "moji" and meaning "character") and "門司" (also pronounced as "moji" but meaning a name of a city in west Japan). Also stored therein, as the second Chinese character information correlated to a Japanese character string "しゅうりょう" (pronounced as "shuryo" and meaning "end" among a plurality of meanings), for instance, Chinese characters such as "終了" (pronounced as "shuryo" and meaning "end"), "修了" (also pronounced as "shuryo" and meaning "completion of studying"), "収量" (also pronounced as "shuryo" and meaning "yield"), "秋涼" (also pronounced as "shuryo" and meaning "cool weather in autumn"), and a command "終" (pronounced as "shuryo komando" and meaning "end command") for executing the processing for ending operations of the application software 103. The Chinese character information table 200 can also store therein a plurality of second Chinese character information for the same command. For instance, as shown in FIG. 3, the table 200 can store therein the same command "終了コマンド" (end command) correlated to both of Japanese character strings "おわり" (pronounced as "owari" and meaning "end") and "しゅうりょう" (pronounced as "shuryo" and meaning "end"). Similarly, the Chinese character information table 200 can store therein the same command "印刷コマンド" (pronounced as "insatsu komando" and meaning "print command") correlated to both of Japanese character strings "いんさつ" (pronounced as "insatsu" and meaning "printing" among a plurality of meanings) and "ぷりんと" (pronounced as "purinto" and meaning "printing" among a plurality of meanings).

The Chinese character information table 200 also provides therein flags for discrimination between a Chinese character and a command. A flag of "1" is set, for instance, for a command. For this reason, information with the flag of "1" can be identified as a command.

It should be noted that Chinese characters such as "印刷" (pronounced as "insatsu" and meaning "printing") or the like as Chinese characters correlated to a character string are shown as they are in the Chinese character information table 200 in FIG. 3. Actually, however, character codes corresponding to the Chinese characters such as "印刷" (pronounced as "insatsu" and meaning "printing")or the like is stored therein. Also, the commands are described as "終了コマンド" (pronounced as "shuryo komando" and meaning "end command") and "印刷コマンド" (pronounced as "insatsu komando" and meaning "printing command"), but actually, character codes are stored therein for displaying, for instance, a command name or a command specifying information for specifying a command corresponding to the command name or the like.

The FEP 102 is actuated at start of the application software 103, or according to an instruction by the user. The FEP 102 comprises a determining section 201 for determining, according to keyentry from the keyboard 108, which character string, instruction for Kana-to-Chinese character conversion, or instruction for selection/decision of a candidate for conversion has been input or the like. The FEP 102 also comprises a retrieving section 202 for retrieving, by referring to the Chinese character information table 200, the first Chinese character information or second Chinese character information corresponding to the inputted character string when an instruction for Kana-to-Chinese character conversion has been received and outputting the retrieved information as candidates for conversion.

Figure 4:
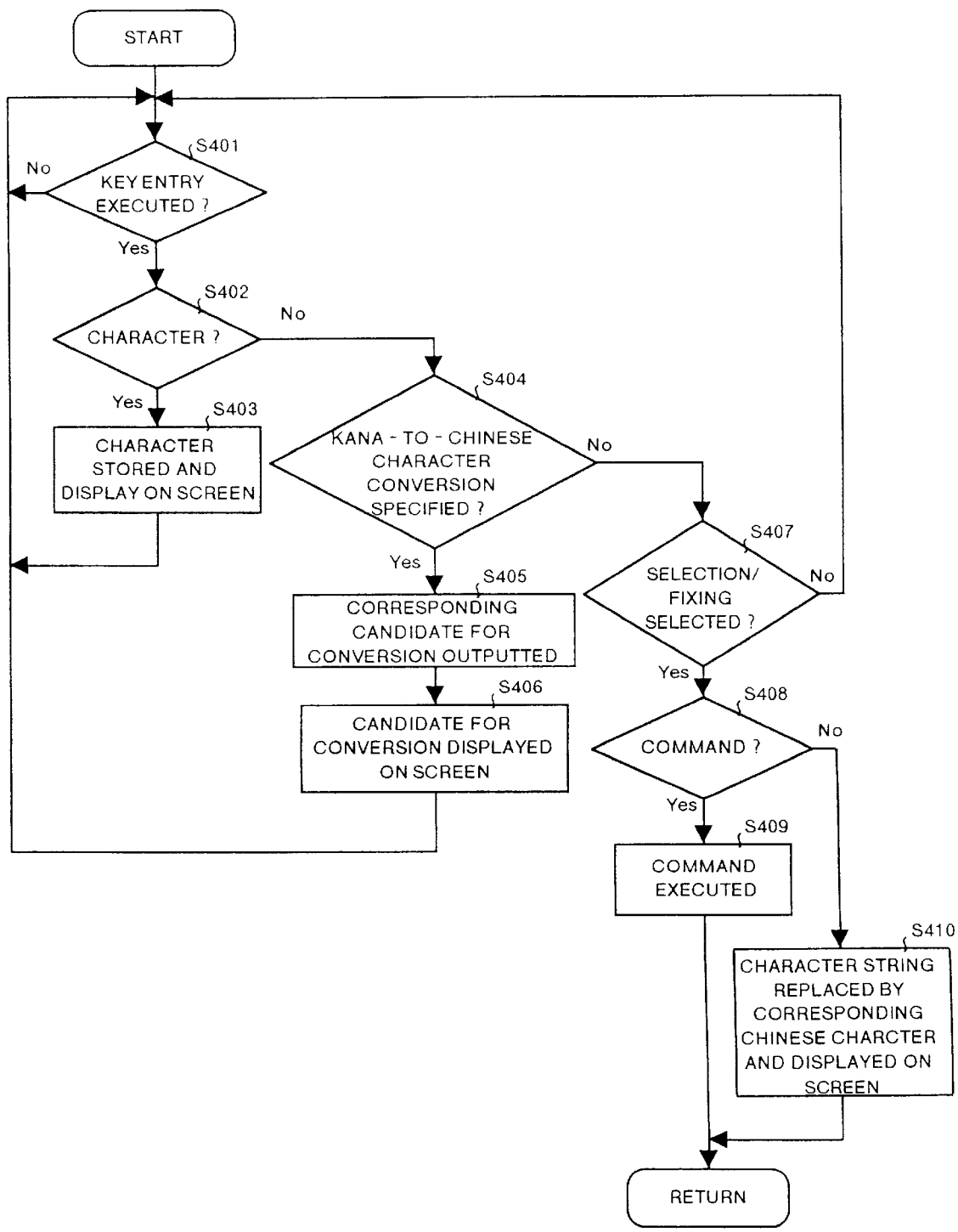
FIG. 4 is a flow chart showing the command inputting method according to Embodiment 1.

Next detailed description is made for the command inputting method according to Embodiment 1 with reference to a flow chart. FIG. 4 is a flow chart showing a command inputting method according to Embodiment 1.

It is assumed that the OS 101, FEP 102, and application software 103 are ready for executing their respective operations. It is assumed herein that the application software 103 used for description is a word processor.

The FEP 102 makes determination, when a key entry is received from the keyboard 108 (S401), as to whether the input character string is a character or not in the determining section 201 thereof (S402).

When it is determined in step S402 that a character has been input, the input character(s) is (are) stored in a specified work area of the RAM 106. The application software 103 requests, in response to the above operation, the OS 101 to display the character(s) on the screen, and the OS 101 displays the character(s) on the CRT 109 in accordance with the request from the application software 103 (S403).

The FEP 102 returns to step S401, after execution of the processing in step S403, to wait for a next key entry through the keyboard 103.

Herein, it is assumed that, for instance, Japanese characters of "し(shi)", "ゅ(yu)", "う(u)", "り(ri)", "ょ(yo)", "う(u)" are successively input through the keyboard 108. In this case, the processing between the steps S401 and S403 are repeated. As a result, as shown in FIG. 5, a Japanese character string "しゅうりょう" (pronounced as "shuryo" and meaning "end" among a plurality of meanings) is displayed on the screen. Then the FEP 102 returns again to step S401 to wait for a next key entry through the keyboard 108.

Then, the FEP 102 determines, when any key entry is received through the keyboard 108 (S401), whether the input character string is a character or not in the determining section 201 thereof (S402). The FEP 102 further determines, when it is determined in step S402 that the input is not a character, whether the input character string is an instruction for the Kana-to-Chinese character conversion or not in the determining section 201 thereof (S404).

When it is determined in step S404 that the input is an instruction for the Kana-to-Chinese character conversion, the FEP 102 retrieves the Chinese character information table 200 in the retrieving section 202 to output candidates for conversion corresponding to the character string stored in the RAM 106 (S405). For instance, the first Chinese character information or the second Chinese character information corresponding to the Japanese character string of "しゅうりょう" (pronounced as "shuryo" and meaning "end" among a plurality of meanings) is output as candidates for conversion. As shown in FIG. 3, "終了" (pronounced as "shuryo" and meaning "end"), "修了" (also pronounced as "shuryo" and meaning "completion of studying"), "収量" (pronounced as "shuryo" and meaning "yield"), "秋涼" (also pronounced as "shuryo" and meaning "cool weather in autumn"), and a command "終了コマンド" (pronounced as "shuryo komando" and meaning "end command"), which all belong to the second Chinese character information, correspond to the character string of "しゅうりょう" (pronounced as "shuryo").

Figure 6:
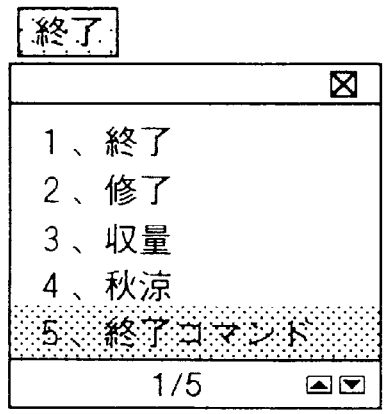
FIG. 6 is an explanatory view showing a state in which candidates for converting the Japanese character string of "しゅうりょう(shuryo)" are displayed in a list by the command inputting method according to Embodiment 1.

The application software 103 receives candidates for conversion from the FEP 102 and requests the OS 101 to display the candidates for conversion in a list on the screen. The OS 101 displays, as shown in FIG. 6, the candidates for conversion in a list on the CRT 109 according to the request from the application software 103 (S406).

It should be noted that the FEP 102 checks, when outputting the first Chinese character information or the second Chinese character information as candidates for conversion, a flag corresponding to each candidate for conversion in the retrieving section 202. When it is found that there is any candidate for conversion with a flag set therein, the FEP 102 outputs a display change command for changing colors or attributes displayed on the screen together with a command for displaying the candidate for conversion. The OS 101 displays, when having received this command for changing a display, the command "終了コマンド" (pronounced as "shuryo komando" and meaning "end command") on the screen by changing the colors or display attributes. Thus, the command can be discriminated from the Chinese characters "終了" (pronounced as "shuryo" and meaning "end")and "修了" (also pronounced as "shuryo" and meaning "completion of studying") or others.

The FEP 102 returns again to step S401 when the processing in the step S406 ends, and waits for a next key entry through the keyboard 108. Herein, the user can select, according to the candidates for conversion displayed on the screen in a list shown in FIG. 6, any of the Chinese character "終了" (pronounced as "shuryo" and meaning "end")or the like or "終了コマンド" (pronounced as "shuryo komando" and meaning "end command").

Then, the FEP 102 determines, when having received any key entry through the keyboard 108 (S401), as to whether the input character string is a character or not in the determining section 201 thereof (S402). The FEP 102 determines, when it is determined in step S402 that the input is not a character, as to whether the input character string is an instruction for the Kana-to-Chinese character conversion or not in the determining section 201 (S404). The FEP 102 further determines, when it is determined in step S404 that the input is not an instruction for the Kana-to-Chinese character conversion, as to whether the inputted character string is an instruction for selection/decision of a candidate for conversion or not in the determining section 201 thereof (S407).

When it is determined in step S407 that the input is an instruction for selection/decision of a candidate for conversion, the FEP 102 checks, a flag corresponding to the candidate for conversion in the determining section 201, and determines whether the selected candidate for conversion is a command name or a Chinese character or not (S408).

When it is determined in step S408 that a command name has been selected from the candidates for conversion, for instance, the FEP 102 outputs, information for specifying the corresponding command. As a result, the OS 101 and the application software 103 execute the prespecified processing (S409) for the command. For instance, when "終了コマンド" (pronounced as "shuryo komando" and meaning "end command") has been selected from the candidates for conversion shown in FIG. 6, the processing for ending operations of the application software 103 is executed. It should be noted that the application software 103 may display, when the end processing is to be executed, a dialog box 700 on the screen prompting the user to check whether a text being prepared needs to be saved or riot, and save of the text, if necessary.

It is also assumed herein that the user has selected, according to the display of the candidates for conversion in a list as shown in FIG. 6, for instance, "終了" pronounced as "shuryo" and meaning "end")as a Chinese character candidate for conversion. The FEP 102 determines that Chinese characters have been selected in step S408 and outputs the corresponding character code. As a result, the OS 101 and application software 103 execute the specified processing, replace a Japanese character string of "しゅうりょう" (pronounced as "shuryo" and meaning "end" among a plurality of meanings) shown in FIG. 8 with the corresponding "終了" (also pronounced as "shuryo" and meaning "end"), and display the Chinese characters on the CRT 109 (S410).

Figure 9:
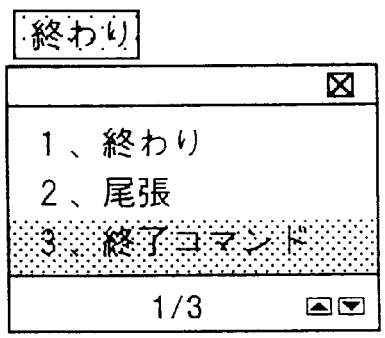
FIG. 9 is an explanatory view showing a state in which candidates for conversion of a Japanese character string of "おわり" (pronounced as "owari" and also meaning "End" among a plurality of meanings) are displayed in a list by the command inputting method according to Embodiment 1.

In the command inputting method according to Embodiment 1, even when a Japanese character string of "おわり" (pronounced as "owari" and meaning "end" among a plurality of meanings) is input similarly to the case where the Japanese character string of "しゅうりょう" (pronounced as "shuryo" and meaning "end" among a plurality of meanings) is input, the command name of "終了コマンド" (pronounced as "shuryo komando" and meaning "end command") can be displayed on the screen as one of candidates for conversion. Namely, when the user inputs the Japanese character string of "おわり" (pronounced as "owari" and meaning "end")and instructs Kana-to-Chinese character conversion for the above string, as shown in FIG. 9, Chinese characters of "終わり" (also pronounced as "owari" and meaning "end)", "尾張" (also pronounced as "owari" and meaning a name of a region in Japan), and the command name "終了コマンド" (pronounced as "shuryo komando" and meaning "end command"), each of which is the second Chinese character information corresponding to the Japanese character string of "おわり" (pronounced as "owari" and meaning "end" among a plurality of meanings), are displayed on the screen in a list form (S406). Then, when the user selects selected "終了コマンド" (pronounced as "shuryo komando" and meaning "end command"), the FEP 102 outputs, for instance, information specifying the command. As a result, the OS 101 and application software 103 execute prespecified processing for ending operations of the application software 103 (S409). As described above, a desired command can be input with different character strings by having previously stored a plurality of second Chinese character information for which the same command has been correlated in the Chinese character information table 200. For instance, like the Japanese character strings of "おわり" (pronounced as "owari" and meaning "end" among a plurality of meanings) and "しゅうりょう" (pronounced as "shuryo" and meaning "end" among a plurality of meanings) described above, a desired command can be input with the help of a synonym by correlating the same command to character strings having the same meaning and having previously stored them in the Chinese character information table 200.

Thus, the operability of the application software 103 can be improved. Namely, when the user wants to input a command "終了コマンド" (pronounced as "shuryo komando" and meaning "end command"), the user may input any character string correlated to the Chinese character string of "終了" (pronounced as "shuryo" and meaning "end")and executes processing for Kana-to-Chinese character conversion for the Chinese character string, whereby the processing for ending operations of the application software 103 can be executed.

Figure 10:
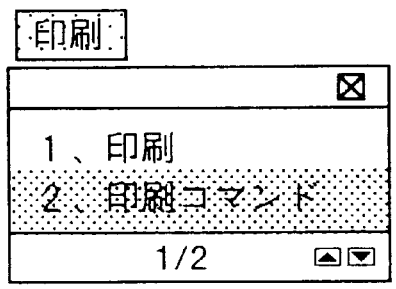
FIG. 10 is an explanatory view showing a state in which candidates for conversion of a Japanese character string of "いんさつ" (pronounced as "insatsu" and meaning "printing" among a plurality of meanings) are displayed in a list by the command inputting method according to Embodiment 1.
Figure 11:
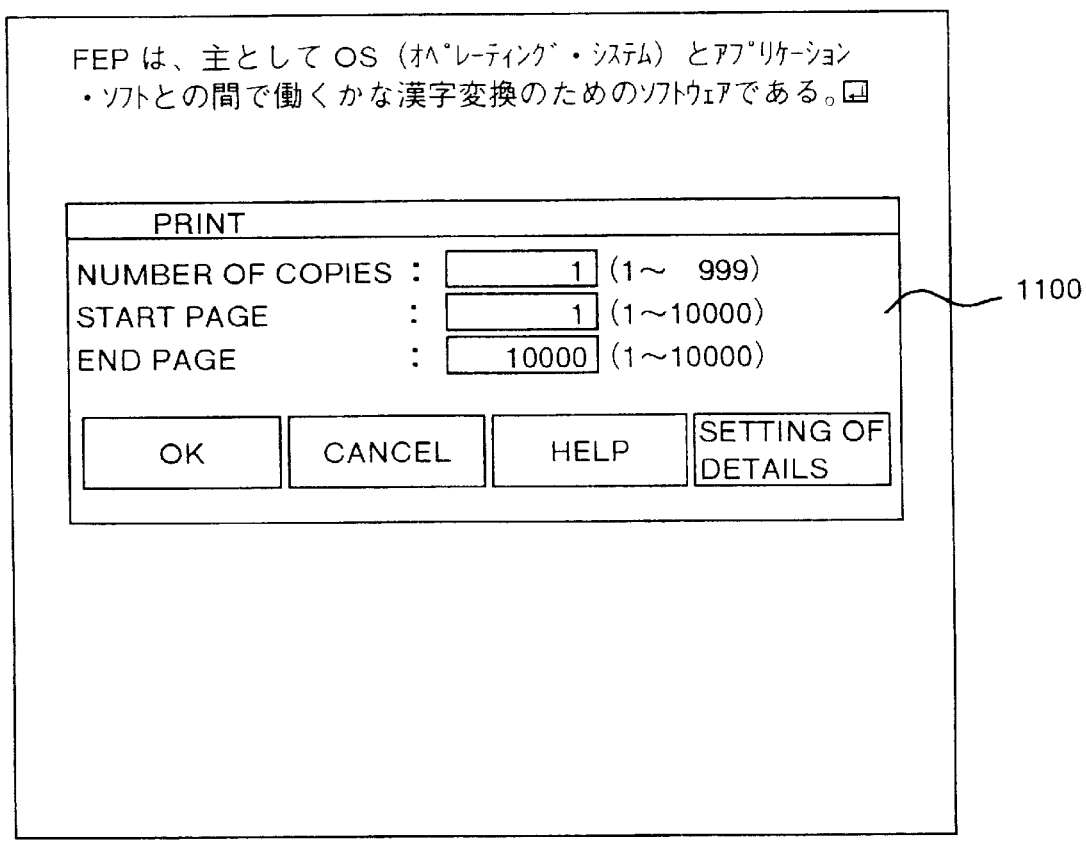
FIG. 11 is an explanatory view showing a state in which a dialog box for printing options is displayed on the screen when printing options is executed by the command inputting method according to Embodiment 1.

In the command inputting method according to Embodiment 1, also when a Japanese character string of "いんさつ" (pronounced as "insatsu" and meaning "printing" among a plurality of meanings) is input similarly to the case where the Japanese character string of "しゅうりょう" (pronounced as "shuryo and meaning "end" among a plurality of meanings) is input, the corresponding Chinese characters "印刷" (pronounced as "insatsu" and meaning "printing") and command name "印刷コマンド" (pronounced as "insatsu komando and meaning "printing command") are displayed on the screen in a list as shown in FIG. 10 (S406). Then, when the user selects "印刷コマンド" (pronounced as "insatsu komando" and meaning "printing command"), the FEP 102 outputs, for instance, information specifying the corresponding command. As a result, the OS 101 and application software 103 execute prespecified processing for printing the text prepared by the application software 103. When this operation for printing is to be executed, for instance, a dialog box 1100 for setting therein the number of copies to be printed or the like may be displayed on the screen as shown in FIG. 11 to prompt for instruction from the user.

As described above, with the command inputting method according to Embodiment 1, a command can be input in the same way as that for inputting characters. Thus, the user does not have to remember a menu structure or shortcut keys. Also, the user can continue operations without operating a mouse which requires the user to move his (her) hand off from the keyboard. Thus, the command inputting method makes it possible to achieve a high-speed operation and also to simplify the operation. Further, an operation for inputting a command is controlled by the FEP. Thus, various commands can be input with the same operation even when different application software is used, making it possible to improve the operability of application software. As described above, with the command inputting method according to Embodiment 1, operations required for inputting commands can be unified. Thus, an environment with extremely high operability can be provided to users, especially beginners.

Also, with the command inputting method according to Embodiment 1, any command can be inputted in the same way as that for inputting characters, so that icons and a menu screen each for selecting a command are not required. Accordingly, the user can use a wider screen obtained thereby. Furthermore, a command can be input with a natural language comprising such as a Japanese character string of "しゅうりょう" (pronounced as "shuryo" and meaning "end" among a plurality of meanings), so that the user can intuitively give an instruction to execute a desired processing to the software.

It should be noted that, in the command inputting method according to Embodiment 1, if an instruction to execute Kana-to-Chinese character conversion is requested, candidates for conversion are displayed on a screen in a list as shown in FIG. 6 (S406). However, the software may execute such processing instead, that one or more Chinese characters as a first candidate among the candidates for conversion are first displayed on the screen. The user specifies either selection of the Chinese character(s) as the first candidate or a display of all the candidates for conversion thereon, and the input character string is replaced with the Chinese character(s) as the first candidate or all the candidates for conversion correlated to the inputted character string are displayed on the screen according to the specification. Then the software waits for a next instruction from the user.

Shown in the Chinese character information table 200 in FIG. 3 are only "終了コマンド" (pronounced as "shuryo komando" and meaning "end command") and "印刷コマンド" (pronounced as "insatsu komando" and meaning "printing command"), but in addition to those two commands, any commands such as "保存コマンド" (pronounced as "hozon komando" and meaning "save command"), "複写コマンド" (pronounced as "fukusha komando" and meaning "copy command"), "移動コマンド" (meaning "ido komando" and meaning "move command"), and "削除コマンド" (pronounced as "sakujo komando" and meaning "delete command") or the like can also be stored in the Chinese character information table 200 correlated to an arbitrary character string.

Also, in the Chinese character information table 200 in FIG. 3, any character string not correlated to any Chinese character such as, for instance, a character string of "ぷりんと" (pronounced as "purinto" and meaning "printing")can also be registered, and this type of character string can also be correlated to a command. It should be noted that a character string comprising Katakana (one of two types of Japanese character) "プリント" (also pronounced as "purinto" and meaning "printing")and the command "印刷コマンド" (pronounced as "insatsu komando" and meaning "print command") are correlated to the Japanese character string "ぷりんと" (also pronounced as "purinto" and meaning "printing"). However even a character string correlated only to a command can be registered in the Chinese character information table 200.

Grammatical information and information for learning, in addition to the Chinese character information table 200, may also be stored in the Chinese character dictionary 104. Then, the FEP 102 is made to have a function for dividing an input character string to phrases using the grammatical information stored in the Chinese character dictionary so that the FEP can execute Kana-to-Chinese character conversion using this function. However, even when, for instance, "終了コマンド" (pronounced as "shuryo komando" and meaning "end command") is selected as a candidate for conversion correlated to the Japanese character string "しゅうりょう" (pronounced as "shuryo" and meaning "end" among a plurality of meanings), it is desirable that the "終了コマンド" (pronounced as "shuryo komando" and meaning "end command") will not be registered in the information for learning as the first candidate among the candidates for conversion correlated to the Japanese character string "しゅうりょう" (pronounced as "shuryo" and meaning "end" among a plurality of meanings). With the operations described above, it is possible to prevent any command from being executed due to a user's inappropriate instruction for selection/decision of a candidate.

It is also desired that the FEP 102 or application software 103 can provide controls for enabling input of a command only after a return key or a punctuation key is pressed down. For instance, a user might select inappropriately an end command in the middle of preparing a text. Thus, even if a command is included among the candidates for conversion, processing may be so programmed that the end command is not displayed thereon as a candidate for conversion before the text is finished. Or the end command is displayed but the command cannot be selected.

Furthermore, as shown in the flow chart in FIG. 4, when a command is input, processing is executed in the order of inputting a character string, displaying the corresponding candidates for conversion on the screen according to the inputted character string, and then selecting any command among the candidates for conversion. However processing may be designed so that a command is automatically selected and executed by using both a shift key and a specific key after the character string is inputted. For instance, by inputting the character string of "しゅうりょう" (pronounced as "shuryo" and meaning "end" among a plurality of meanings) and pressing down the shift key and a CTRL key, the end command can automatically be selected, whereby operations of the application software 103 can easily be ended.

Next description is made for a command inputting method according to Embodiment 2. The command inputting method according to Embodiment 2 is different from the command inputting method according to Embodiment 1 in that a command can be recorrelated to an arbitrary character string in the Chinese character information table 200, and a macro command prepared by the user can be registered therein in correlation to an arbitrary character string. Herein a macro command specifies a series of processing steps which are registered therein as one command. It should be noted that the OS 101, FEP 102, and application software 103 are the same as those described above, so that description thereof is omitted herein.

FIG. 12 is an explanatory view of a Chinese character information table 1200 for executing the command inputting method according to Embodiment 2. The flags of Chinese character information table 1200 are different from the flags of the Chinese character information table 200. It is assumed that, in the Chinese character information table 1200 shown in FIG. 12, a flag [01] is set for a command, and a flag [11] is set for a macro command. Although a command and a macro command are not always necessarily discriminated from each other, by discriminating one from the other, each of display colors and attributes used for the two can be changed when both the command and macro command exist in candidates for conversion. As described above, if it is possible to use different display colors and attributes for a command and a macro command, the user can instantly determine whether a candidate for conversion is a command or a macro command as soon as the user looks at it. It should be noted that the processing for changing display colors and attributes is the same as that described in relation to Embodiment 1, so that description thereof is omitted herein. In the Chinese character information table 1200 shown in FIG. 12, a macro command is shown as "a macro command for a sales performance table", but actually, character codes for displaying a macro name. A macro file name, and macro command specifying information or the like each correlated to the macro name are stored therein.

Figure 13:
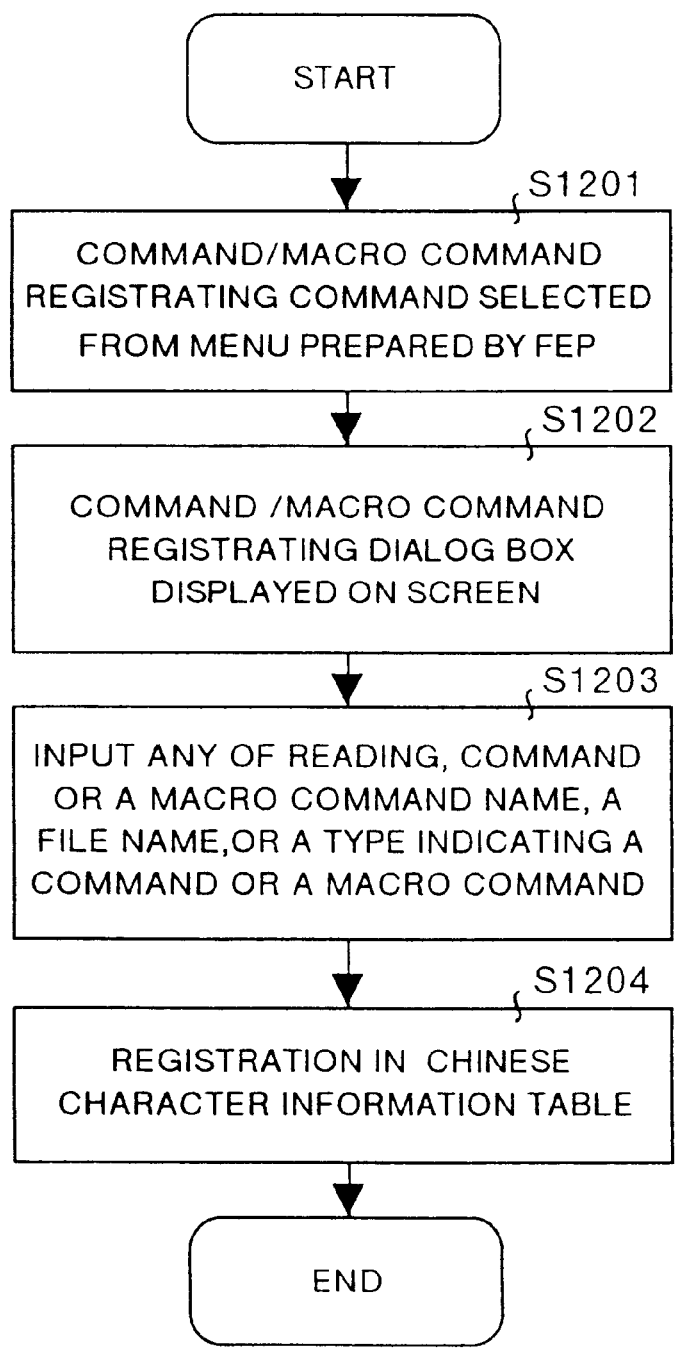
FIG. 13 is a flow chart showing steps for registering a command or a macro command in the command inputting method according to Embodiment 2.

Next description is made for the command inputting method according to Embodiment 2 with reference to one of flow charts. FIG. 13 is a flow chart showing registering steps of a command or a macro command in the table in the command inputting method according to Embodiment 2.

To register a command or a macro command therein, the user selects a command/macro command registering command from the menu prepared in the FEP 102 (S1201). It should be noted that this command/macro command registering command can be input using the command inputting method described in Embodiment 1.

The FEP 102 requests the OS 101 to display a dialog box for command/macro command registration on the screen, and the OS 101 displays a dialog box 1400 for command/macro command registration on the screen of the CRT 109 in response to the request from the FEP 102 (S1202).

The user enters a character string correlating to a command or a macro command, a command name or a macro command name, a file title of the command or the macro command, and a type of the command or the macro command in the dialog box 1400 displayed on the screen, and enters an instruction for registration therein (S1203).

The FEP 102 registers, when having received the instruction for registration, the contents entered in the dialog box 1400 in the Chinese character information table 1200 (S1204).

Figure 15:
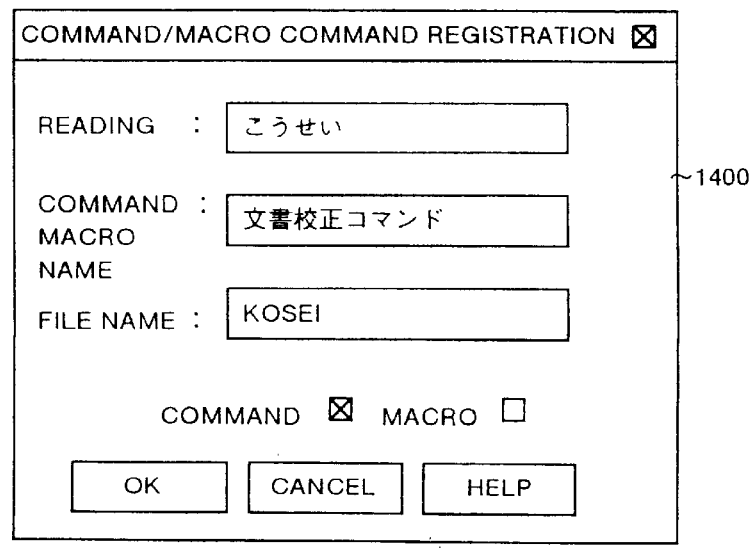
FIG. 15 is an explanatory view showing a state in which information for registration of a command has been entered in the dialog box for registration of a command/macro command by the command inputting method according to Embodiment 2.

FIG. 15 is an explanatory view showing a state in which information for registration of a command has been entered in the dialog box for registration of a command or a macro command in the command inputting method according to Embodiment 2. As described above, by inputting information for a command to be registered in the dialog box 1400 and instructing the 257,) registration (S1203), a command "文書校正コマンド" (pronounced as "bunsho kosei komando" and meaning "text proofreading command") and a flag "01" each correlating to a Japanese character string "こうせい" (pronounced as "kosei" and meaning "proofreading" among a plurality of meanings) are registered in the Chinese character information table 1200 shown in FIG. 12 (S1204). It should be noted that the text proofreading command herein is a command for execution of an operation for proofreading a processed text such as unifying styles in the text or checking whether incorrect characters/omitted characters exist therein or not or whether the way of using Kana in the text is correct or not, or the like.

Figures 16, 17:
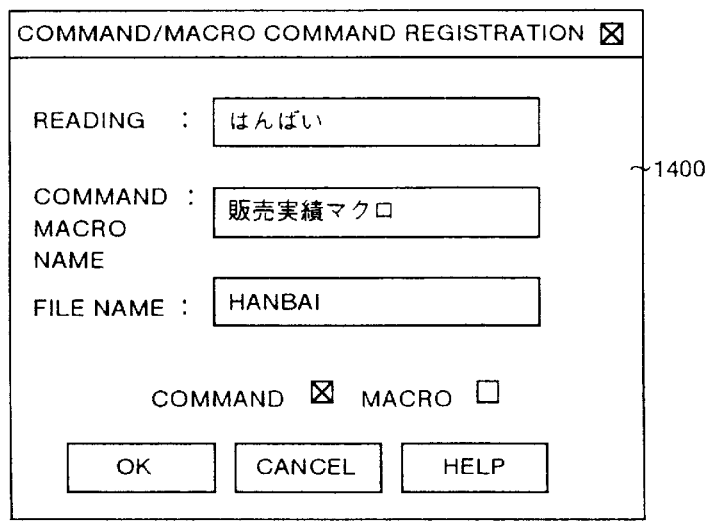
FIG. 16 is an explanatory view showing a state in which information for registration of a macro command has been entered in the dialog box for registration of a command/macro command by the command inputting method according to Embodiment 2.
FIG. 17 is an explanatory view showing a result of execution of a macro command to be registered by the command inputting method according to Embodiment 2.

FIG. 16 is an explanatory view showing a state in which information for registration of a macro command has been entered in the dialog box for registration of a command/macro command in the command inputting method according to Embodiment 2. The user is required to previously prepare a macro file for registration of a macro command. Herein, it is assumed that a macro command used for automatically preparing a sales performance table shown in FIG. 17 is registered. After preparation of the macro file, as shown in FIG. 16, by inputting information for a macro command to be registered in the dialog box 1400 and instructing the registration (S1203), a macro command "販売実績表マクロ" (pronounced as "hanbai-jissekihyo-makuro" and meaning "sales performance table macro") and a flag "11" each correlating to a Japanese character string "はんばい" (pronounced as "hanbai" and meaning "sales" among a plurality of meanings) are registered in the Chinese character information table 1200 shown in FIG. 12 (S1204).

Figure 14:
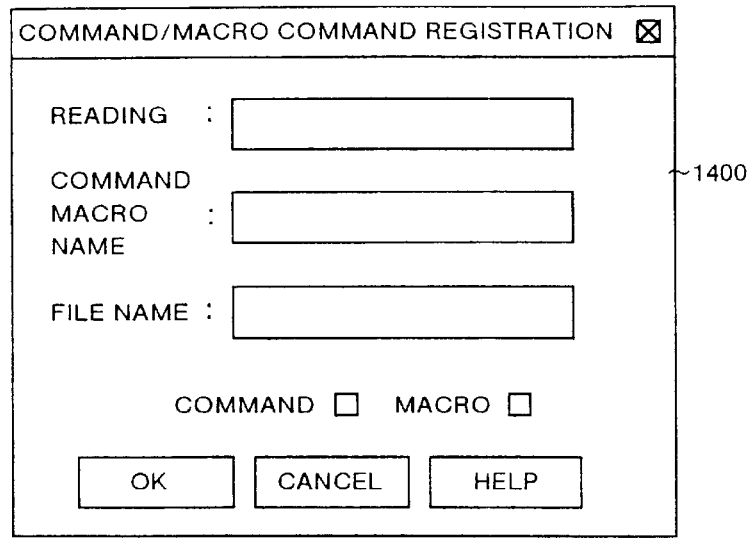
FIG. 14 is an explanatory view showing a state in which a dialog box for registration of a command/macro-command is displayed on the screen by the command inputting method according to Embodiment 2.

It should be noted that any command can be registered only in the first Chinese character information. On the other hand, any macro command can be registered in the first Chinese character information, and any command belonging to the second Chinese character information can be changed to a macro command. Further, any command or macro command registered in the second Chinese character information can be changed to other command or other macro command, and can also be deleted. When any command or macro command is to be changed or deleted, the dialog box 1400 as shown in FIG. 14 can also be used.

Figure 18:
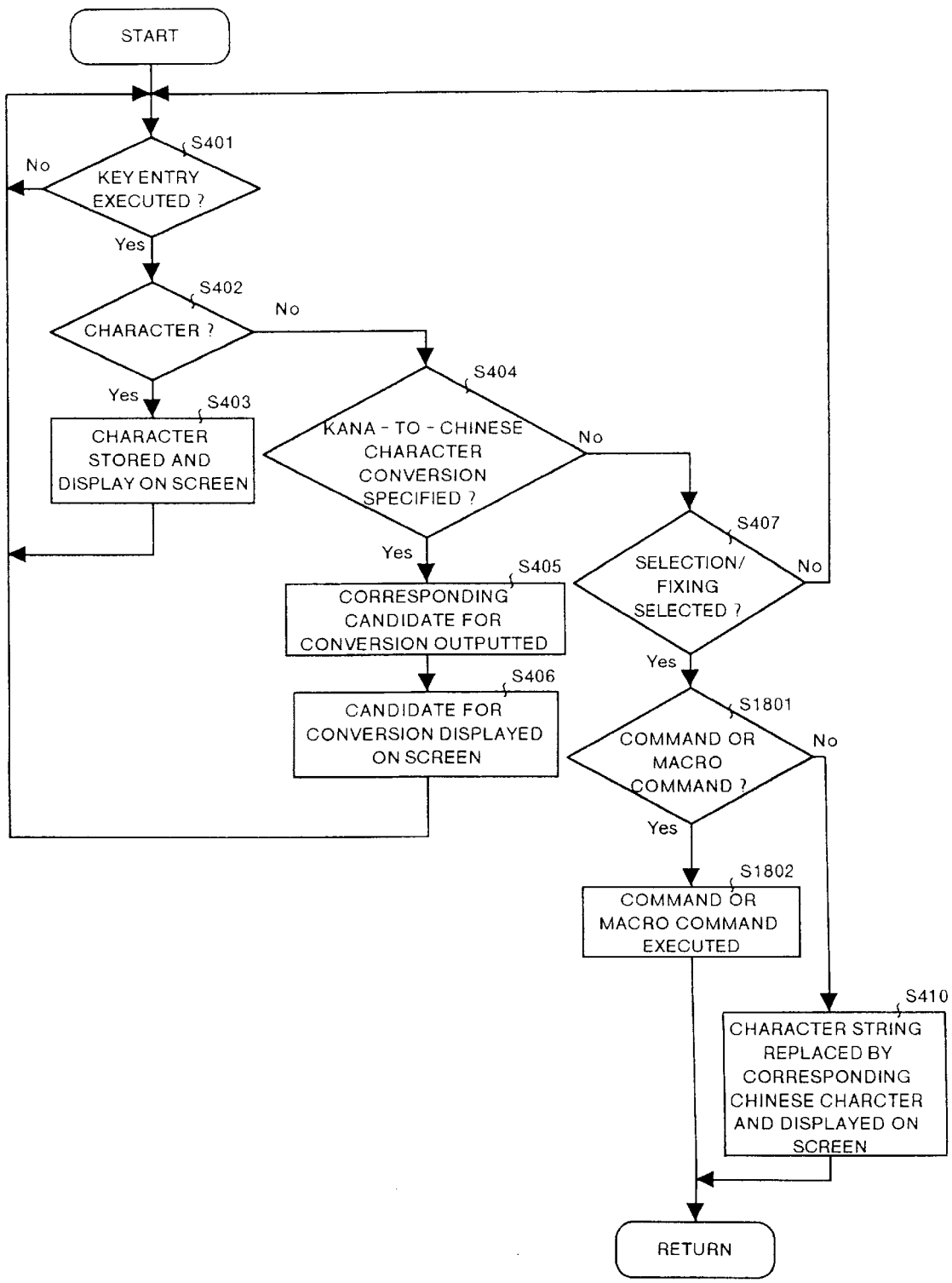
FIG. 18 is a flow chart showing the command inputting method according to Embodiment 2.

Next description is made for a command inputting method for execution of the command and macro command registered as described above. FIG. 18 is a flow chart showing the command inputting method according to Embodiment 2. It should be noted that the flow chart shown in FIG. 18 is basically the same as that shown in FIG. 4. Thus, the same reference numerals are assigned to the steps corresponding to those in FIG. 4. Description of inputting commands is also the same as that described in Embodiment 1, so that description thereof is omitted herein, and description is made for specification of a macro command, mainly for those steps different from those shown in FIG. 4.

Figure 19:
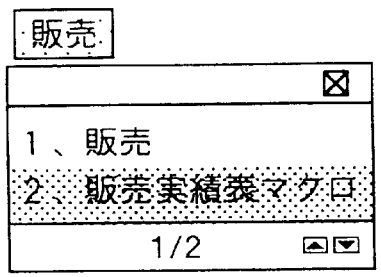
FIG. 19 is an explanatory view showing a state in which candidates for conversion of a Japanese character string of "はんばい" (pronounced as "hanbai" and meaning "selling" among a plurality of meanings) are displayed in a list by the command inputting method according to Embodiment 2.

A Japanese character string "はんばい" (pronounced as "hanbai" and meaning "sales" among a plurality of meanings) is input in steps S401 to S403. When candidates for conversion correlating to the Japanese character string of "はんばい" (pronounced as "hanbai" and meaning "sales" among a plurality of meanings) are output in step S404 and S405, the strings "販売" (also pronounced "hanbai" and meaning "sales") and "販売実績表 マクロ" (pronounced as "hanbai-jissekihyo-makuro" and meaning "sales performance table macro") are displayed on the screen as the candidates for conversion as shown in FIG. 19 (S406).

The FEP 102 determines, when an instruction for selection/decision of a candidate for conversion in step S407 is received, whether the corresponding candidate for conversion is a command, a macro command, or a Chinese character or not in the determining section 201 (S1801). When the "販売実績表マクロ" (pronounced as "hanbai-jissekihyo-makuro" and meaning "sales performance table macro") is selected herein from among the candidates for conversion shown in FIG. 19, the FEP 102 outputs, for instance, information specifying the corresponding macro command. As a result, the OS 101 and application software 103 execute the macro command prepared by the user according to the prespecified processing steps, and the sales performance table shown in FIG. 17 is displayed on the screen.

As described above, with the command inputting method according to Embodiment 2, commands and macro commands each of which can be input in the same way as that described in Embodiment 1 can be added to the previous ones. Commands which can newly be registered belonging only to the first Chinese character information. Thus, the meaning of a character string and the contents of a command can be registered by matching them with each other. For this reason the user does not have to remember the correlation between character strings and commands.

With the command inputting method according to Embodiment 2, the macro command prepared by the user can be specified to be executed in the same input environment as that for a command, which makes it possible to improve the operability of application software.

If an UNDO command function, for instance, by pressing down a BS (backspace) key while the CTRL key is pressed down is provided in the FEP 102 (both keys may be the CTRL key and a Z key), even when where the user erroneously selects any command or macro command among candidates for conversion and the selected command or macro command is executed, the display can easily be returned to the original state. It is needless to say that the UNDO command may be input according to characters input through the keyboard 108. It should be noted that, when any command or macro command is one with which the UNDO command can not be executed, a dialog box displaying the impossibility of executing the UNDO therein can be displayed on the screen so that the user can understand what it means.

Even if a macro command is executed as described above and the sales performance table shown in FIG. 17 can easily be displayed on the screen, data input to the table has to be executed for each cell. For this reason, when the same macro command is executed again after data is inputted in the sales performance table by executing a macro command once, the sales performance table can be set so that it can be displayed on the screen in a form storing therein the data input just before the display is executed. It is needless to say that a sales performance table with no data therein can also be displayed on the screen according to previous specification thereof.

It is desirable that the registered macro command is not displayed thereon as the first candidate among the candidates for conversion like that described for the command in Embodiment 1. With the execution described above, it is possible to prevent any macro command from being executed due to incorrect instruction issued by the user for selection/decision of a candidate.

Furthermore, as described for the command in Embodiment 1, it is desirable that the FEP 102 or the application software 103 can control so that specifying a macro command can be executed only after a return key or a punctuation key is pressed down.

Figures 20, 21:
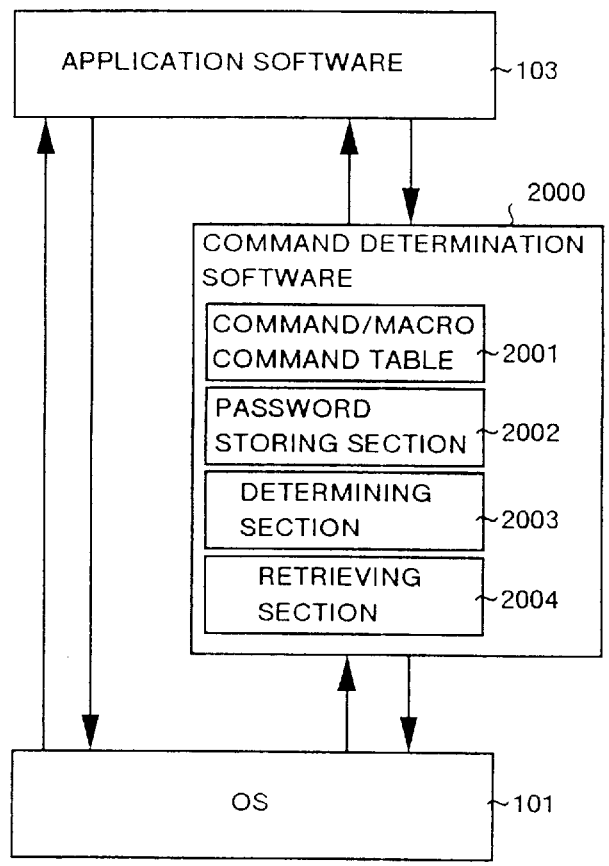
FIG. 20 is a functional block diagram showing a software configuration for implementing a command inputting method according to Embodiment 3.
FIG. 21 is an explanatory view showing a command/macro command table used for executing the command inputting method according to Embodiment 3.

FIG. 20 is a functional block diagram showing a software configuration for implementing a command inputting method according to Embodiment 3. In FIG. 18, the OS 101 provides an environment under which the device shown in FIG. 1 can be operated by users, and executes processing for managing the application software 103 or command determination software 2000, input/output of data, allocation of memory for data, and processing for a screen display or the like.

The application software 103 may be any of a word processor, spreadsheet software, or database software or the like so long as characters can be input. This application software 103 is controlled by the OS 101 in its initialization, execution of various commands, and processing for ending or the like.

The command determination software 2000 starts up in association with initialization of the application software 103, or starts up according to an instruction from the user. The command determination software 2000 comprises a command/macro command table 2001 storing therein character strings and commands or macro commands correlated to the character strings; a password storing section 2002 for storing therein arbitrary character strings such as a password which is input, when any command is input, at the end of an input character string or the like; a determining section 2003 for determining, when any key entry has been received through the keyboard 108, whether the inputted character string is a character or not, or whether it is executed through a space key or not, or the like and also determining whether any command or macro command is to be executed or not; and a retrieving section 2004 for retrieving any corresponding character string from the command/macro command table 2001 according to the inputted character string.

FIG. 21 is an explanatory view showing the command/macro command table 2001 for executing the command inputting method according to Embodiment 3. It should be noted that FIG. 21 does not show all character strings and commands/macro commands correlated to the character strings for convenience of description. The command/macro command table 2001 stores therein, for instance, a command "終了コマンド" (pronounced as "shuryo komando" and meaning "end command") correlating to an English character string of "end" or a command "印刷コマンド" (pronounced as "insatsu komando" and meaning "printing command") correlated to an English character string of "print" or the like. Also the command/macro command table 2001 can store therein, as described in Embodiment 2, any command and any macro command which is prepared by the user and correlated to an arbitrary character string.

It should he noted that, although "end" and others are shown as they are as character strings in the command/macro command table 2001 shown in FIG. 21, the character codes correlating to the character strings such as "end" and others are stored therein. Further, although commands are also shown as "終了コマンド" (pronounced as "shuryo komando" and meaning "end command") and "印刷コマンド" (pronounced as "insatsu komando" and meaning "printing command"), actually, command specifying information specifying a command correlated to a character string is stored therein. Further, the macro command is shown as "販売実績表マクロ" (pronounced as "hanbai-jissekihyo-makuro" and meaning "sales performance table macro"), but actually, a macro command name and information specifying a macro command or the like each correlated to a character string are stored therein.

Next detailed description is made for the command inputting method according to Embodiment 3 with reference to flow charts.

Figure 22:
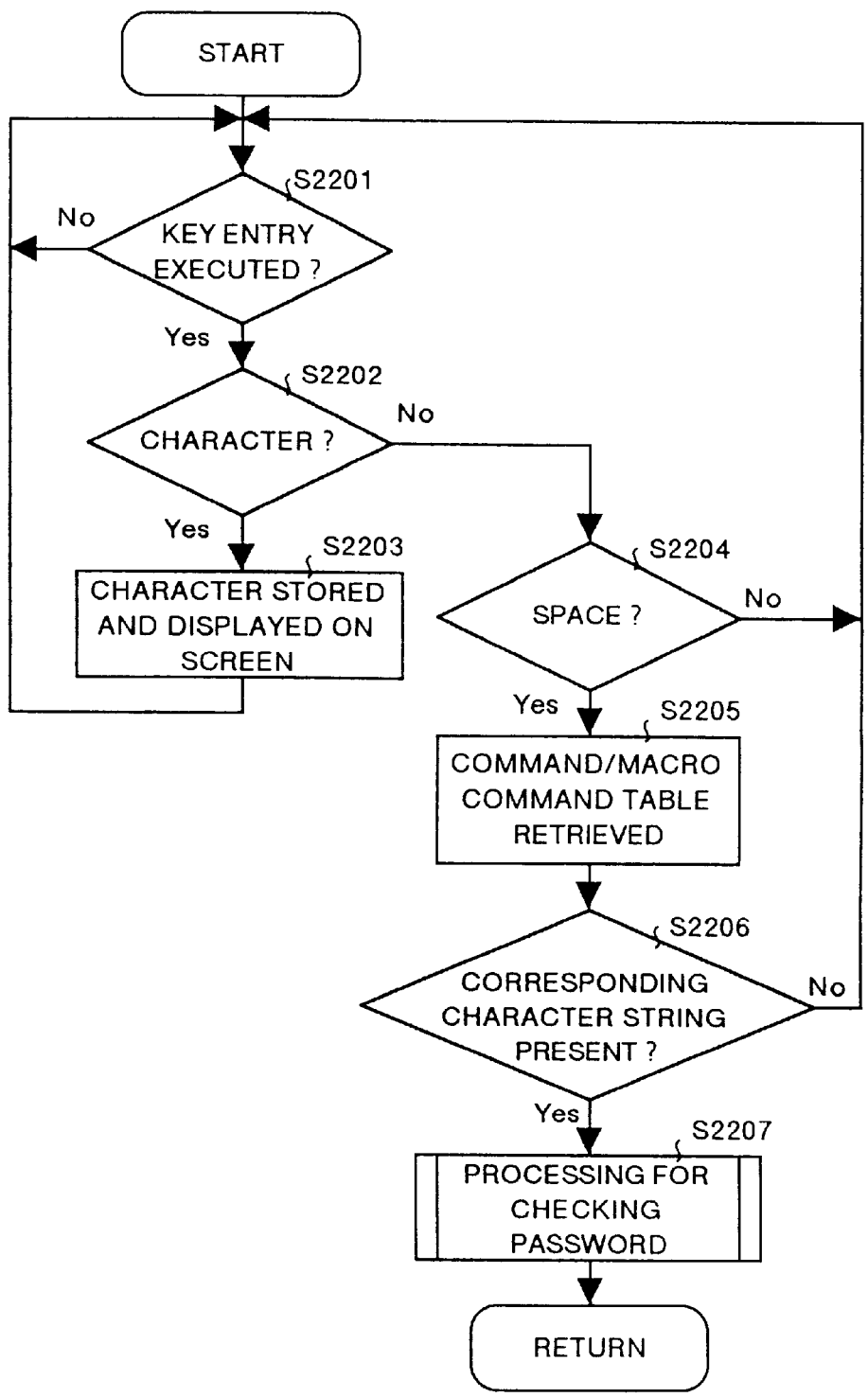
FIG. 22 is a flow chart showing the command inputting method according to Embodiment 3.
Figure 23:
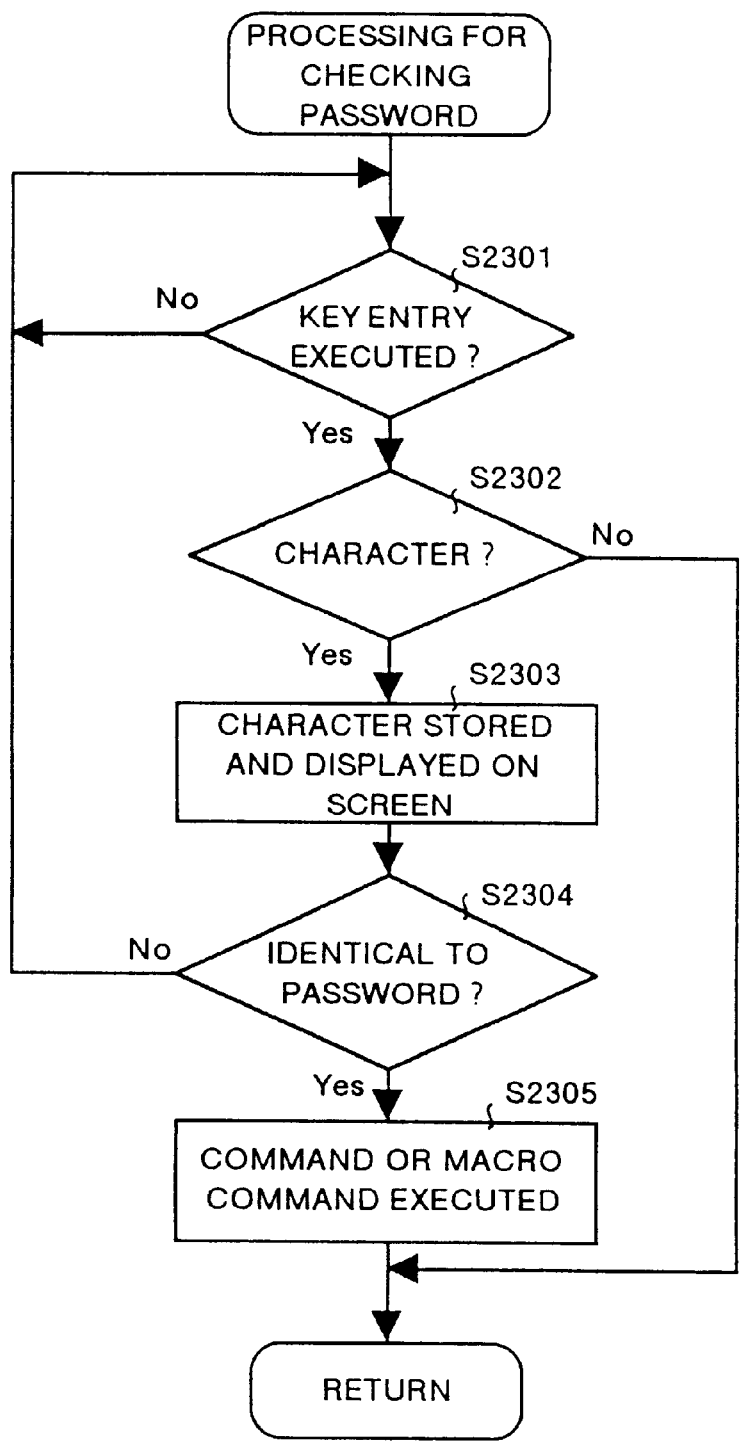
FIG. 23 is a flow chart showing the command inputting method according to Embodiment 3.

FIG. 22 ad FIG. 23 are flow charts each showing the command inputting method according to Embodiment 3.

It is assumed that the OS 101, command determination software 2000 and application software 103 are ready for executing operations respectively. It should be noted that it is assumed that the application software 103 having started up herein is a word processor. A user previously inputs a desired character string in the password storing section 2002 of the command determination software 2000. It is assumed herein that a character string 123456" is input.

The command determination software 2000 determines, when having received any key entry through the keyboard 108 (S2201), as to whether the input character string is a character or not in the determining section 2003 thereof (S2202).

When it is determined in step S2202 that the input is a character, the software 2000 stores the character(s) in a specified work area on the RAM 106. With this operation, the application software 103 requests the OS 101 to display the character(s) on the screen. Then the OS 101 displays the character(s) on the CRT 109 in accordance with the request from the application software 103 (S2203).

The command determination software 2000 returns, after execution of the operation in step S2203, to step S2201 to wait for a next key entry through the keyboard 108.

For instance, assuming that characters "e", "n", "d" have successively been inputted from the keyboard 108, operations in steps S2201 to S2203 are executed repeatedly. As a result a character string of "end" is displayed on the screen as shown in FIG. 24.

Then, the command determination software 2000 determines, when having received any key entry through the keyboard 108 (S2201), as to whether the inputted character string is a character or not in the determining section 2003 thereof (S2202). The command determination software 2000 further determines, when it is determined in step S2202 that a character has not been received, as to whether the input is executed through a space key or not in the determining section 2003 (S2204).

The command determination software 2000 determines, when it is determined in step S2204 that it is through the space key, as to whether there is any character string correlated thereto in the command/macro command table 2001 or not by retrieving, for instance, the character string of "end" correlated to the inputted character string "end" from in the command/macro command table 2001 in the retrieving section 2004 (S2205, S2206). For instance, the character string of "end" is stored in the command/macro command table 2001 shown in FIG. 21 and is correlated to "終了コマンド" (pronounced as "shuryo komando" and meaning "end command").

The command determination software 2000 proceeds, when it is determined in step S2206 that there is the corresponding character string therein, to step S2301 shown in FIG. 23 to check a password (S2207). On the other hand, the command determination software 2000 returns, when it is determined in step S2206 that the inputted character string is neither a command nor a macro command, to step S2201 to input a next character.

The command determination software 2000 starts checking the password and determines, when having received any key entry through the keyboard 108 (S2301), as to whether the input character string is a character or not in the determining section 2003 (S2302).

when it is determined in step S2302 that it is a character, the discriminated characters are stored in a specified work area on the RAM 106. With this operation, the application software 103 requests the OS 101 so as to display the characters on the screen, when the OS 101 displays the characters on the CRT 109 in accordance with the request from the application software 103 (S2303). It is assumed that, for instance, a character "1" is input herein and displayed on the screen.

Then the command determination software 2000 determines, in the determining section 2003 thereof, as to whether there is correlation between the inputted character (s) and the password or not (S2304). The command determination software 2000 outputs, when it is determined that there is correlation therebetween, information specifying the corresponding command or macro command. The OS 101 and application software 103 execute, according to the specified processing method, the corresponding command or macro command (S2305). On the other hand, the command determination software 2000 returns, when it is determined that there is not correlation therebetween, to step S2301 to wait for a next key entry through the keyboard 108.

Figure 7:
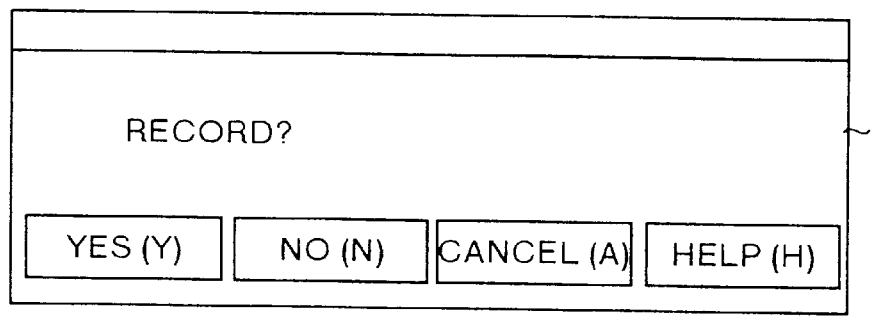
FIG. 7 is an explanatory view showing a state in which a dialog box prompting for saving of a text is displayed on a screen when processing for ending execution of an application software is executed by the command inputting method according to Embodiment 1.

It is assumed herein that the command determination software 2000 executes the operations in steps S2301 and S2304 and inputs characters "2", "3", "4", "5", "6" following the character "1". As a result, as shown in FIG. 25, a character string of "123456" is displayed on the screen following the character string of "end". The command determination software 2000 compares, in step S2304, the character string "123456" to the preset password to determines as to whether there is correlation between the two or not. The password set in Embodiment 3 is "123456" which is the same as the inputted password "123456". Accordingly, the command determination software 2000 outputs command specifying information (end command) corresponding to the English character string of "end" (Refer to FIG. 21). As a result, the OS 101 and application software 103 execute the prespecified processing to perform the end processing for the application software 103 (S2305). It should be noted that, when the processing for ending operations of the application software 103 is to be executed, a dialog box 700 may be displayed on the screen so that the user can check if the text being processed needs to be save or not, and then the processing for saving the text may be executed (Refer to FIG. 7).

The command determination software 2000 ends the processing for checking the password, when it is determined in step S2302 that the input is not a character, namely that the input is from a space key or a return key. However, when any correction is made to the character string by executing any processing such as deletion of characters or the like, the password checking can be performed again.

Furthermore, as shown in FIG. 21, when an English character string of "print" and the password are input, print processing can automatically be executed. This print command inputting method and other command inputting methods are the same as those described in FIG. 22 and FIG. 23, so that detailed description thereof is omitted herein.

As described above, with the command inputting method according to Embodiment 3, any command can be input in the same way as that for inputting characters, so that the user does not have to remember layers of menus nor shortcut keys. Also, any command can be input in the same method as that for inputting characters, so that the user can continue operations without operating a mouse which requires the user to move his (her) hand off the keyboard, making it possible to achieve high-speed operation as well as to simplify the operation. Further, inputting of commands is controlled by the command determination software 2000, so that various commands can be input with the same operation even when different application software is used, making it possible to improve operability of application software. As described above, with the command inputting method according to Embodiment 3, operations required for inputting commands can be unified, so that an environment under which the operability thereof is extremely high can be provided to users, especially to the beginners.

It should be noted that, as described above, the command inputting method according to Embodiment 3 is described assuming that it is performed under the environment for inputting English. However even under the environment for inputting Japanese, the command inputting method according to Embodiment 3 is applicable when the command determination software 2000 is used in the mode of inputting characters in a half size as compared to the regular size.

Also, in the command inputting method according to Embodiment 3, any command is programmed to be executed when the prespecified character string and password are input. However a command may be programmed to be executed, different from the case described above, when the prespecified character string is input and simultaneously the prespecified key entry is executed or when a specified period of time passes after the prespecified character string is inputted. It should be noted that determination in this case will also be made by the command determination software 2000.

As described above, the description was made for the command inputting methods according to Embodiments 1 to 3 of the present invention. However, the present invention provides a command inputting method enabling input of a command in the same way as that for inputting ordinary characters on application software. It is possible to freely design or change which processing is to be performed, after a command is input, for execution of the command by the FEP 102 or command determination software 2000, or OS 101 and application software 103.

It should be noted that the command inputting methods described in Embodiments 1 to 3 can be provided as part of a word processing program by recording them in a computer-readable medium such as a floppy disk, a hard disk, a CD-ROM, or a DVD or the like.

As described above, the command inputting method according to the present invention, comprises a determining step of determining whether an arbitrary character string input through a keyboard or the like is a command or not by referring to command information comprising a command correlated to a character string. The method includes an executing step of executing a corresponding command when it is determined in the determining step that the arbitrary character string is a command. Thus, a command can be input in the same way as that for inputting characters, and the necessity to remember a menu structure or shortcut keys is eliminated. Also, as a command can be input in the same way as that for inputting characters, the necessity to move a hand from a keyboard to operate a mouse is eliminated, so that operations can be executed easily at a high speed.

The command inputting method used when inputting characters using software for Kana (Japanese character)-to-Chinese character conversion according to the present invention comprises a Chinese character information outputting step of outputting first Chinese character information or second Chinese character information corresponding to an arbitrary character string input through a keyboard or the like by referring to a Chinese character dictionary in which the first Chinese character information comprising at least one Chinese character correlated to a character string and second Chinese character information comprising a command and at least one Chinese character each correlated to a character string are previously stored. The method includes a listing step of inputting the first Chinese character information or second Chinese character information from the Chinese information outputting step and displaying the input first Chinese character information or second Chinese character information as candidates for conversion in a list. The method includes a selecting step of selecting a desired Chinese character or a command from the first Chinese character information or second Chinese character information displayed in a list and a determining step of determining which Chinese character or command has been selected according to a result of selection in the selecting step. Furthermore the method includes a replacing and displaying step of replacing, when it is determined in the determining step that a Chinese character has been selected, the arbitrary character string input through the keyboard or the like with corresponding Chinese characters and displaying the Chinese characters and an executing step of executing the corresponding command when it is determined in the determining step that a command has been selected. Thus, a command can be input in the same way as that for inputting characters, and the necessity to remember a menu structure or shortcut keys is eliminated. Also, since a command can be input in the same way as that for inputting characters, the necessity to move a hand from a keyboard to operate a mouse is eliminated, so that operations can be executed easily at a high speed. Further, command input is controlled with software for Kana-to-Chinese character conversion, so that, even when different types of application software are is used, various command input can be carried out through common operations, and operability of application software can be improved.

The command inputting method used when inputting characters using software for Kana-to-Chinese character conversion according to the present invention comprises a Chinese character information outputting step of outputting first Chinese character information or second Chinese character information corresponding to an arbitrary character string input through a keyboard or the like by referring to a Chinese character dictionary in which the first Chinese character information comprising at least one Chinese character correlated to a character string and second Chinese character information comprising a command and at least one Chinese character each correlated to a character string are previously stored. The method includes a first candidate displaying step of inputting first Chinese character information or second Chinese character information from the Chinese character information outputting step and displaying a first candidate Chinese character from among the first Chinese character information or second Chinese character information input as described above as a candidate for conversion and a specifying step of specifying whether the first candidate Chinese character displayed in the first candidate displaying step has been selected or not. Furthermore, the method includes a listing step of displaying in a list the first Chinese character information or second Chinese character information input from the Chinese character information outputting step when the Chinese character as a first Candidate was not selected in the specifying step; a selecting step of selecting a desired Chinese character or a command from the first Chinese character information or second Chinese character information displayed in a list; a determining step of determining which Chinese character and command has been selected according to a result of selection in the selecting step; a replacing and displaying step of replacing the arbitrary character string input through a keyboard or the like with Chinese characters and displaying the Chinese characters when the first candidate Chinese character has been selected in the selecting step or when it is determined in the determining step that Chinese characters have been selected; and an executing step of executing a corresponding command when it is determined in the determining step that a command has been selected. Thus, a command can be input in the same way as that for inputting characters, and the necessity to remember a menu structure or shortcut keys is eliminated. Also, since a command can be input in the same way as that for inputting characters, the necessity to move a hand from a keyboard to operate a mouse is eliminated, so that operations can be executed easily at a high speed. Also as command input is controlled by software for Kana-to-Chinese character conversion, even when different types of application software are used, various commands can be inputted through common operations, and operability of application software can be improved. Further, since a Chinese character is prepared as a first candidate for conversion, erroneous selection of a command can be prevented.

In the command inputting method used when inputting characters using software for Kana-to-Chinese character conversion according the present invention, the Chinese character dictionary includes a plurality of second Chinese character information for which the same command has been set. Thus, a desired command can be input also by using different character strings. By storing the same command in the Chinese character dictionary in correlation to a plurality of character strings each having the same meaning, it is possible to find a desired command according to the synonym as a key and operability of application software can be improved.

The command inputting method used when inputting characters using software for Kana-to-Chinese character conversion according to the present invention further comprises a generating step of registering a command in the first Chinese character information in the Chinese character dictionary and generating second Chinese character information. Thus, a command which can be input in the same way as that for inputting characters can be added anew. Further as a command can be registered anew only in the first Chinese character information, for instance, a character string can be registered with the meaning correlated to contents of a command. Thus, operability of application software can be improved. On the other hand, when registering a command in the first Chinese character information, a desired way of reading the command can be registered, so that the way of reading can be utilized as a password. For instance, when use of a command by other persons is to be inhibited, the other persons cannot execute the command without permission by a user because the user registered the command with a specific way of reading the command not having any specific relation with a function of the command and known only to the user.

The command inputting method used when inputting characters using software for Kana-to-Chinese character conversion according to the present invention comprises a generating step of generating second Chinese character information that specifies a series of processing steps for the first Chinese character information in the Chinese character dictionary; and a changing step of changing a command for the second Chinese character information in the Chinese character dictionary to a macro command. Thus, a user can register a macro command prepared by the user and execute the macro command by specifying the macro command in the same way as that for inputting characters. For this reason operability of the application software can be improved. On the other hand, when registering a macro command, a desired way of reading the macro command can be registered, so that the way of reading can be utilized as a password. For instance, when use of a macro command by other persons is to be inhibited, the other persons cannot execute the macro command without permission by a user, because the user registered the macro command with a specific way of reading the macro command not having any specific relation with a function of the macro command and known only to the user.

The command inputting method used when inputting characters using software for Kana-to-Chinese character conversion according to the present invention further comprises a step of changing or deleting a command or a macro command for the second Chinese character information in the Chinese character dictionary. Thus, a command or a macro command can be changed to a desired command or a desired macro command, and also an unnecessary command or a macro command can be deleted.

In the command inputting method used when inputting characters using software for Kana-to-Chinese character conversion according to the present invention, different colors or attributes are used for a command and a Chinese character when listed in the listing step. Thus, a user can determine whether a displayed candidate for conversion is a Chinese character or a command all at once. For this reason erroneous selection of a command can be prevented.

In the command inputting method used when inputting characters using software for Kana-to-Chinese character conversion according to the present invention, different colors or attributes are used in display for command, a macro command, and a Chinese character, when listed in a list in the listing step. Thus, a user can determine whether a displayed candidate for conversion is a Chinese character or a command or a macro command all at once. For this reason erroneous selection of a command or macro command can be prevented.

The command inputting method used when inputting characters using software for Kana-to-Chinese character conversion according to the present invention comprises a Chinese character information outputting step of outputting first Chinese character information or second Chinese character information corresponding to an arbitrary character string input through a keyboard or the like by referring to a Chinese character dictionary in which the first Chinese character information comprising at least one Chinese character correlated to a character string and second Chinese character information comprising a command and at least one Chinese character each correlated to a character string are previously stored. The method includes a listing step of inputting first Chinese character information or second Chinese character information from the Chinese character information outputting step and displaying in a list the inputted first Chinese character information or second Chinese character information as candidates for conversion and a selecting step of selecting a desired Chinese character or a macro command from the first Chinese character information or second Chinese character information displayed in a list. The method also includes a determining step of determining which Chinese character or macro command has been selected according to a result of selection in the selecting step; a replacing and displaying step of replacing the arbitrary Chinese character string input through a keyboard or the like with Chinese characters and displaying the Chinese characters when it is determined in the determining step that a Chinese character has been selected; and a executing step of executing the corresponding macro command when it is determined in the determining step that a macro command has been selected. Thus, a macro command can be specified in the same way as that for inputting characters, and the necessity to remember a menu structure and shortcut keys is eliminated. Also since a macro command can be specified in the same way as that for inputting characters, the necessity to move hand from a keyboard to operate a mouse is eliminated, and easy and high speed operations can be realized. Further since specification of a macro command is controlled by software for Kana-to-Chinese character conversion, even when different types of application software are used, various macro commands can be executed through common operations, and operability of application software can be improved.

In the command inputting method used when inputting characters using software for Kana-to-Chinese character conversion according to the present invention, a command or a macro command can be selected only immediately after carriage return is executed, so that a misoperation such as selecting the end command during preparation of a text can be prevented.

The command inputting method according to the present invention comprises a first determining step of determining by referring to command information comprising a character string and a command correlated to the character string whether an arbitrary character string input through a keyboard or the like matches a character string in the command information; a second determining step of determining by referring to command execution restricting information which restricts conditions for execution of each command whether the conditions for execution of each command are satisfied or not; and an executing step of executing the corresponding command when it is determined in the second determining step that the conditions for execution are satisfied. Thus, a command can be input in the same way as that for inputting characters, and the necessity to remember a menu structure and shortcut keys is eliminated. Also since a command can be input in the same way as that for inputting characters, the necessity to move a hand from the keyboard to operate a mouse is eliminated, and easy and high-speed operations can be realized. Further even when different types of application software are used, various types of commands can be input through common operations, so that operability of application software can be improved.

In the computer-readable medium according to the present invention, a program causes a computer to execute any of the methods according to the present invention is recorded, so that a command can be input in the same way as that for inputting characters by causing a computer to execute this program, and the necessity to remember a menu structure and shortcut keys is eliminated. Also since a command can be input in the same way as that for inputting characters, the necessity to move a hand from the keyboard to operate a mouse is eliminated, and easy and high-speed operations can be realized. Further even when different types of application software are used, various types of commands can be input through common operations, so that operability of application software can be improved.

This application is based on Japanese patent application No. HEI 9-046603 filed in the Japanese Patent Office on Feb. 28, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A command inputting method used when inputting characters using software for Kana (Japanese character)-to-Chinese character conversion comprising the steps of:

receiving a string comprising a plurality of characters through a keyboard;

determining whether the character string is a command or not by looking up the string in command information comprising a command correlated to a character string;

executing a corresponding command when it is determined in the determining step that the string is a command; and replacing the string with at least one corresponding Chinese character when it is not determined that the character string is a command.

2. A computer-readable medium in which a program causing a computer to execute the method of claim 1 is recorded.

3. A command inputting method used when inputting characters using software for Kana (Japanese character)-to-Chinese character conversion comprising the steps of:

receiving a string comprising a plurality of characters through a keyboard;

retrieving first Chinese character information or second Chinese character information corresponding to the character string by looking up the string in a Chinese character dictionary in which the first Chinese character information, comprising at least one Chinese character correlated to a character string, and the second Chinese character information, comprising a command and at least one Chinese character correlated to a character string, are previously stored;

displaying the retrieved first Chinese character information or second Chinese character information as candidates for conversion in a list;

receiving input for selecting a desired Chinese character or a command from the first Chinese character information or second Chinese character information displayed in a list;

determining which of a Chinese character or a command has been selected or not according to a result of selection in said selecting step;

replacing, when it is determined in said determining step that a Chinese character has been selected, the string with at least one corresponding Chinese character and displaying the at least one Chinese character; and executing the corresponding command when it is determined in said determining step that a command has been selected.

4. A command inputting method used when inputting characters using software for Kana-to-Chinese character conversion according to claim 3; wherein said Chinese character dictionary includes a plurality of second Chinese character information for which the same command has been set.

5. A command inputting method used when inputting characters using software for Kana-to-Chinese character conversion according to claim 3 further comprising a generating step of registering a command in the first Chinese character information in said Chinese character dictionary and generating second Chinese character information.

6. A command inputting method used when inputting characters using software for Kana-to-Chinese character conversion according to claim 3 further comprising the steps of:

generating second Chinese character information that specifies a series of processing steps for the first Chinese character information in said Chinese character dictionary; and changing a command for the second Chinese character information in said Chinese character dictionary to a macro command.

7. A command inputting method used when inputting characters using software for Kana-to-Chinese character conversion according to claim 3 further comprising:

a step of changing or deleting a command or a macro command for the second Chinese character information in said Chinese character dictionary.

8. A command inputting method used when inputting characters using software for Kana-to-Chinese character conversion according to claim 3; wherein different colors or attributes are used for a command and a Chinese character respectively when listed in said listing step.

9. A command inputting method used when inputting characters using software for Kana-to-Chinese character conversion according to claim 6; wherein different colors or attributes are used in displaying a command, a macro command, and a Chinese character, respectively, when listed in a list in said listing step.

10. A command inputting method used when inputting characters using software for Kana-to-Chinese character conversion according to claim 3; wherein a command or a macro command can be selected only just after a carriage return is entered.

11. A computer-readable medium in which a program causing a computer to execute the method of claim 3 is recorded.

12. A command inputting method used when inputting characters using software for Kana-to-Chinese character conversion comprising the steps of:

receiving a string comprising a plurality of characters through a keyboard;

retrieving first Chinese character information or second Chinese character information corresponding to the string by looking up the string in a Chinese character dictionary in which the first Chinese character information, comprising at least one Chinese character correlated to a character string, and second Chinese character information, comprising a command and at least one Chinese character correlated to a character string are previously stored;

displaying a first candidate Chinese character from among the retrieved first Chinese character information and second Chinese character information as a candidate for conversion;

specifying whether the first candidate Chinese character displayed in said first candidate displaying step had been selected or not;

displaying in a list the first Chinese character information and second Chinese character information when the Chinese character as a first candidate Chinese character was not selected in said specifying step;

receiving input for selecting a desired Chinese character or a command from the first Chinese character information or second Chinese character information displayed in a list;

determining which of a Chinese character or a command has been selected or not according to a result of selection in said selecting step;

replacing the string with at least one Chinese character and displaying the at least one Chinese character when the first candidate Chinese character has been selected in said selecting step or when it is determined in said determining step that a Chinese character has been selected; and executing a corresponding command when it is determined in said determining step that a command has been selected.

13. A command inputting method used when inputting characters using software for Kana-to-Chinese character conversion according to claim 12; wherein said Chinese character dictionary includes a plurality of second Chinese character information for which the same command has been set.

14. A command inputting method used when inputting characters using software for Kana-to-Chinese character conversion according to claim 12 further comprising a generating step of registering a command in the first Chinese character information in said Chinese character dictionary and generating second Chinese character information.

15. A command inputting method used when inputting characters using software for Kana-to-Chinese character conversion according to claim 12 comprising the steps of:

generating second Chinese character information that specifies a series of processing steps for the first Chinese character information in said Chinese character dictionary; and changing a command for the second Chinese character information in said Chinese character dictionary to a macro command.

16. A command inputting method used when inputting characters using software for Kana-to-Chinese character conversion according to claim 12 further comprising:

a step of changing or deleting a command or a macro command for the second Chinese character information in said Chinese character dictionary.

17. A command inputting method used when inputting characters using software for Kana-to-Chinese character conversion according to claim 12; wherein different colors or attributes are used for a command and a Chinese character respectively when listed in said listing step.

18. A command inputting method used when inputting characters using software for Kana-to-Chinese character conversion according to claim 15; wherein different colors or attributes are used in display for command, a macro command, and a Chinese character, respectively, when listed in a list in said listing step.

19. A command inputting method used when inputting characters using software for Kana-to-Chinese character conversion according to claim 12; wherein a command or a macro command can be selected only just after carriage return is entered.

20. A computer-readable medium in which a program causing a computer to execute the method of claim 12 is recorded.

21. A command inputting method used when inputting characters using software for Kana-to-Chinese character conversion comprising the steps of:

- receiving a string comprising a plurality of characters through a keyboard;
- retrieving first Chinese character information or second Chinese character information corresponding to the string by looking up the string in a Chinese character dictionary in which the first Chinese character information, comprising at least one Chinese character correlated to a character string, and second Chinese character information, comprising a command and at least one Chinese character correlated to a character string: are previously stored;
- displaying in a list the retrieved first Chinese character information and second Chinese character information as candidates for conversion;
- receiving input for selecting a desired Chinese character or a macro command from the first Chinese character information or second Chinese character information displayed in a list;
- determining which of a Chinese character or a macro command has been selected or not according to a result of selection in said selecting step;
- replacing the string with at least one Chinese character and displaying the at least one Chinese character when it is determined in said determining step that a Chinese character has been selected; and
- executing the corresponding macro command when it is determined in said determining step that a macro command has been selected.

22. A command inputting method used when inputting characters using software for Kana-to-Chinese character conversion according to claim 21; wherein a command or a macro command can be selected only just after carriage return is entered.

23. A computer-readable medium in which a program causing a computer to execute the method of claim 21 is recorded.

24. A command inputting method used when inputting characters using software for Kana (Japanese character)-to-Chinese character conversion, comprising the steps of:

- receiving a string comprising a plurality of characters through a keyboard;
- determining by looking up the string in command information comprising a character string and a command correlated to said character string whether the string matches a character string in said command information;
- determining by referring to command execution restricting information which restricts conditions for execution of each command are satisfied or not when it is determined that the string matches said character string in said command information;
- executing the corresponding command when it is determined that the conditions for execution are satisfied; and
- replacing the string with at least one corresponding Chinese character when it is not determined that the character string is a command.

25. A computer-readable medium in which a program causing a computer to execute the method of claim 24 is recorded.

* * * * *